June 8, 1965 R. B. McCASKILL ETAL 3,188,002

WRITE-IN FOR VOTING MACHINES

Filed April 19, 1962 8 Sheets-Sheet 1

INVENTORS
ROBERT B. McCASKILL
BY AND IRA G. LAWS
Mason, Kolehmainen, Rathburn and Wyss
ATTORNEYS.

WRITE-IN FOR VOTING MACHINES

Filed April 19, 1962

INVENTORS
ROBERT B. McCASKILL
BY AND IRA G. LAWS
Mason, Kolehmainen, Rathburn and Wyss
ATTORNEYS INVENTORS
ROBERT B. McCASKILL
BY AND IRA G. LAWS
Mason, Kolehmainen, Rathburn and Wyss.
ATTORNEYS.

June 8, 1965 R. B. McCASKILL ETAL 3,188,002

WRITE-IN FOR VOTING MACHINES

Filed April 19, 1962 8 Sheets-Sheet 4

INVENTORS
ROBERT B. McCASKILL
BY AND IRA G. LAWS

Mason, Kolehmainen, Rathburn and Wyss
ATTORNEYS

INVENTORS
ROBERT B. McCASKILL
AND IRA G. LAWS
BY Mason, Kolehmainen, Rathburn and Wyss
ATTORNEYS

WRITE-IN FOR VOTING MACHINES

Filed April 19, 1962

INVENTORS
ROBERT B. McCASKILL
AND IRA G. LAWS
BY Mason, Kolehmainen, Rathburn and Wyss
ATTORNEYS.

WRITE-IN FOR VOTING MACHINES

Filed April 19, 1962

INVENTORS
ROBERT B. McCASKILL
BY AND IRA G. LAWS
Mason, Kolehmainen, Rathburn and Wyss
ATTORNEYS June 8, 1965 R. B. McCASKILL ETAL 3,188,002

WRITE-IN FOR VOTING MACHINES

Filed April 19, 1962 8 Sheets-Sheet 8

INVENTORS
ROBERT B. McCASKILL
AND IRA G. LAWS
BY Mason, Kolehmainen, Rathburn and Wyss
ATTORNEYS.

United States Patent Office 3,188,002
Patented June 8, 1965

1

3,188,002
WRITE-IN FOR VOTING MACHINES

Robert B. McCaskill and Ira G. Laws, Tulsa, Okla., assignors to Seismograph Service Corporation, Tulsa, Okla., a corporation of Delaware Filed Apr. 19, 1962, Ser. No. 188,672
61 Claims. (Cl. 235—54)

This invention relates generally to a write-in for voting machines and is more particularly concerned with a new and improved attachment for a presently existing voting machine to permit the voter to write upon a ballot sheet the names of candidates which do not appear on the main voting panel.

The invention has for a primary object the provision of a compact, relatively inexpensive write-in attachment for voting machines of the type disclosed and claimed in the copending U.S. patent applictaion, Serial No. 120,281 now Patent No. 3,108,744, filed June 28, 1961 by Edward J. Crossland et al. and assigned to the same assignee as the present invention, the attachment being capable of being readily attached to the main voting machine for elections where write-in facilities are desired and being capable of being readily detached from the machines for elections where no such facilities are necessary.

Another object of the invention is to provide a write-in for voting machines of the type employing sliding voting selectors, the write-in being so constructed and arranged that the written ballot is validated only when the voting selectors of the main voting machines are in a non-voting position, thus effectively preventing the voter from overvoting by simultaneously using the voting selectors to cast votes for candidates on the main voting panel and writing in the names of other candidates on the write-in ballot.

A further object of the invention is to provide a write-in for voting machines of the type using a movable scanning mechanism to sense the selections made by the voter, the write-in including a ballot sheet driven in synchronism with the scanning mechanism whenever the voter uses the writein facilities.

The invention has for another object to provide a voting machine of the character described wherein the write-in attachment includes means associated with each column in the voting panel for validating the write-in ballot sheet as the latter is driven past these validating means, the different validating means being rendered effective as the scanning mechanism moves along the voting panel.

The invention has for a further object the provision of a voting machine of the character described including a write-in attachment having an access door which may be opened to expose a portion of the ballot sheet together with means for driving the ballot sheet only if the access door has been opened, thereby to avoid waste of the ballot sheet and, hence, to minimize the amount of ballot sheet consumed during an election.

A still further object of the invention is to provide a voting machine having a new and improved panel construction supporting a plurality of counters and actuating switches capable of being assembled in any desired arrangement on the panel during programming of the voting machine for an election, the switches being assembled in positions corresponding to non-voting positions of the voting selectors and being effective to control the validation of the write-in- ballot.

Still another object of the invention is to provide a voting machine of the type described wherein the switches mounted along each column of the panel have a common electrical connection to the validating means associated with that column, thus simplifying the construction and permitting the switches to be actuated in sequence as the scanning mechanism moves along the panel.

2

It is also an object of the present invention to provide a write-in for voting machines wherein the ballot sheet is advanced by a fixed, predetermined amount following each use thereof in order to preserve the secrecy of the ballot and to expose a clean portion of the sheet for use by the next voter.

The foregoing and other objects are realized by providing a voting machine of the type described in the above-identified copending application Serial No. 120,281 which includes a front panel formed by a plurality of side by side columns each supporting on its outer face a strip extending lengthwise of the column and containing a list of different issues or candidate groups to be voted upon by the voter. Each group is divided into several selecting positions listing the different alternatives or candidates for that particular office. The candidate groups of each column are separated by office stops mounted upon an elongated strip extending along that column, the stops being insertable in different positions along the strip during programming to set up the machine for a particular election. A second strip extending through each column carries vertically spaced pins for actuating the key restoring mechanism, these pins also being insertable at different positions during programming of the machine. Mounted for sliding movement upon the column are several voting keys or selectors there being provided in each office group a number of keys exactly equal to the number of votes being cast in that group. Thus, in the usual office group where a single selection must be made from a group of candidates, only one voting key is provided and this key may be moved from a neutral poistion adjacent one of the office stops to a selecting position adjacent the name of the candidate selected by the voter. This key cannot be moved past the office stops and, hence, only one vote may be cast within the office group. If more than one vote is to be cast within an office group, several voting keys equal in number to the total number of votes to be cast are inserted between the office stops defining that group. If cumulative voting is permitted, the name of each candidate will appear more than once on the candidate strip and, hence, the voter may divide his votes in any manner which he desires by giving all or several of his votes to a single candidate or by splitting them among several candidates. Each column also supports a plurality of detent springs for holding each voting key in a neutral or non-voting position or in any voted position selected.

After the selections have been made by movement of the keys, the voter starts the vote registering operation by depressing a "VOTE" switch which starts the movement of a scanning mechanism along the rear of the voting panel and, at the same time, begins the closing of a cover or curtain for the front panel of the machine. A counter panel at the rear of the voting machine contains a plurality of removable, plug-in type counters, one for each selecting position on the front panel containing a candidate or issue to be decided by the voter and all other positions on the counter panel are left blank. In accordance with the present invention, a detachable, plug-in switch module is placed on the counter panel for each candidate group where provision is to be made for a write-in vote. If more than one write-in vote is permitted for a particular candidate group, a corresponding number of switch modules are provided for this group. Each switch module is placed on the counter panel at a position corresponding to a non-voting or write-in position of the front panel selector. Preferably this non-voting position corresponds to the neutral position of the voting key but a separate write-in position could be used, if desired, although this would have the obvious disadvantage of needlessly using additional front panel positions.

A pair of contact strips extend along each column of the counter panel to engage plugs on the switch modules mounted along that column, thus providing a common electrical connection for the switch modules of each column. The scanning rail carries one counter actuator for each column and also associated with each column is a solenoid for rendering the actuator for that column effective. Thus, only those solenoids associated with columns containing issues on which the voter is qualified to pass are effective to condition their actuators for operating the counters and in all other columns the actuators cannot actuate the counters regardless of the position of the voting keys. As the scanning mechanism moves along the panel, at each position where one of the voting keys in one of the columns has been moved to a selecting position, the actuator associated with that column is rendered effective to advance the counter corresponding to that selecting position and, hence, a vote is registered on the latter counter.

The scanning mechanism takes the form of a horizontal rail which may be rocked about its longitudinal axis so that during sweep in one direction it senses the voter's selections and during sweep in the opposite direction it restores all of the voting keys to their neutral positions. When the scanning rail reaches the end of its sensing sweep, a detent thereon is engaged by a fixed stop to rock the rail to a position wherein the counter actuators cannot engage the counters during the return or key restoring sweep. When the rail is rocked, a set of key restoring devices become effective to engage the voting keys and return them to their neutral positions.

In accordance with the present invention a write-in attachment is adapted to be detachably secured to the voting machine so that it can be used whenever write-in is desired or can be omitted in elections where no write-in is permitted. The write-in attachment includes a housing which is mechanically secured to the main voting machine and is electrically connected to the main voting machine circuits. A write-in ballot sheet is provided containing side by side columns corresponding to the columns of the front panel and also containing aligned rows extending transversely of the sheet, the number of rows being at least equal to the maximum number of candidate groups along any of the front panel columns. Thus, at least one write-in space is provided for each candidate group and by proper programming several such spaces can be used for candidate groups where more than one write-in selection is possible. A portion of the ballot sheet is covered by an access door on the write-in attachment and this door is opened by the voter in order to write the names of any person or persons for whom he desires to vote upon the space or spaces corresponding to the candidate group or office involved. The write-in entries are made by the voter before the "VOTE" switch of the main voting machine is depressed. When the latter switch is operated, the ballot sheet is advanced by a ballot feed mechanism connected through a flexible drive to the drive mechanism for the scanning rail. An electrically operated or magnetic clutch is included in the flexible drive to the ballot feed mechanism and is interlocked electrically with an interlock switch operated by the write-in access door. The latter switch prevents the clutch from being actuated to advance the ballot sheet unless the voter opens the write-in door, thus insuring that the ballot sheet will not be driven when the voting machine is used by the normal voter who does not use the write-in facilities. This, of course, economizes upon the total amount of ballot paper used during a particular election and, hence, reduces the size of the write-in attachment by avoiding the necessity for a very large storage space for the ballot paper.

As the scanning mechanism moves along the counter panel, at each position where one of the voting keys has been left in a non-voting position, the actuator associated with that column is rendered effective to actuate the switch module corresponding to that particular non-voting position assuming, of course, that the counter panel contains a module at such position. The conducting strips of each column are connected to a validating means in the form of a solenoid operated punch in the write-in attachment, one punch being provided for each column. Thus, when a switch module is actuated, the solenoid operated punch associated with its column is energized to validate the write-in ballot. Since the write-in ballot sheet movement is synchronized with that of the scanning rail, the validating mark appears on the write-in ballot at a position corresponding to the actuated switch module. Thus, each space on the ballot sheet can be validated but if the voting key is not in its non-voting position the switch module for that space will not be actuated and no validation will be provided. During the vote tabulation only the validated write-in votes will be counted and, as a result, the voter cannot overvote the machine by simultaneously moving the voting key in a particular candidate group and, at the same time, using the write-in space for that group. The advance of the ballot sheet is terminated by a paper operated switch which is actuated when a perforation in the edge of the sheet reaches the switch position. When the latter switch is actuated, the magnetic clutch is de-energized and the drive to the ballot sheet is interrupted thus stopping the sheet at a precise position to bring a clean area of the sheet beneath the access door.

The invention, both as to its organization and manner of operation, together with further objects and advantages thereof will best be understood by reference to the following detailed description taken in conjunction with the accompanying drawings wherein.

Figures 1, 2:
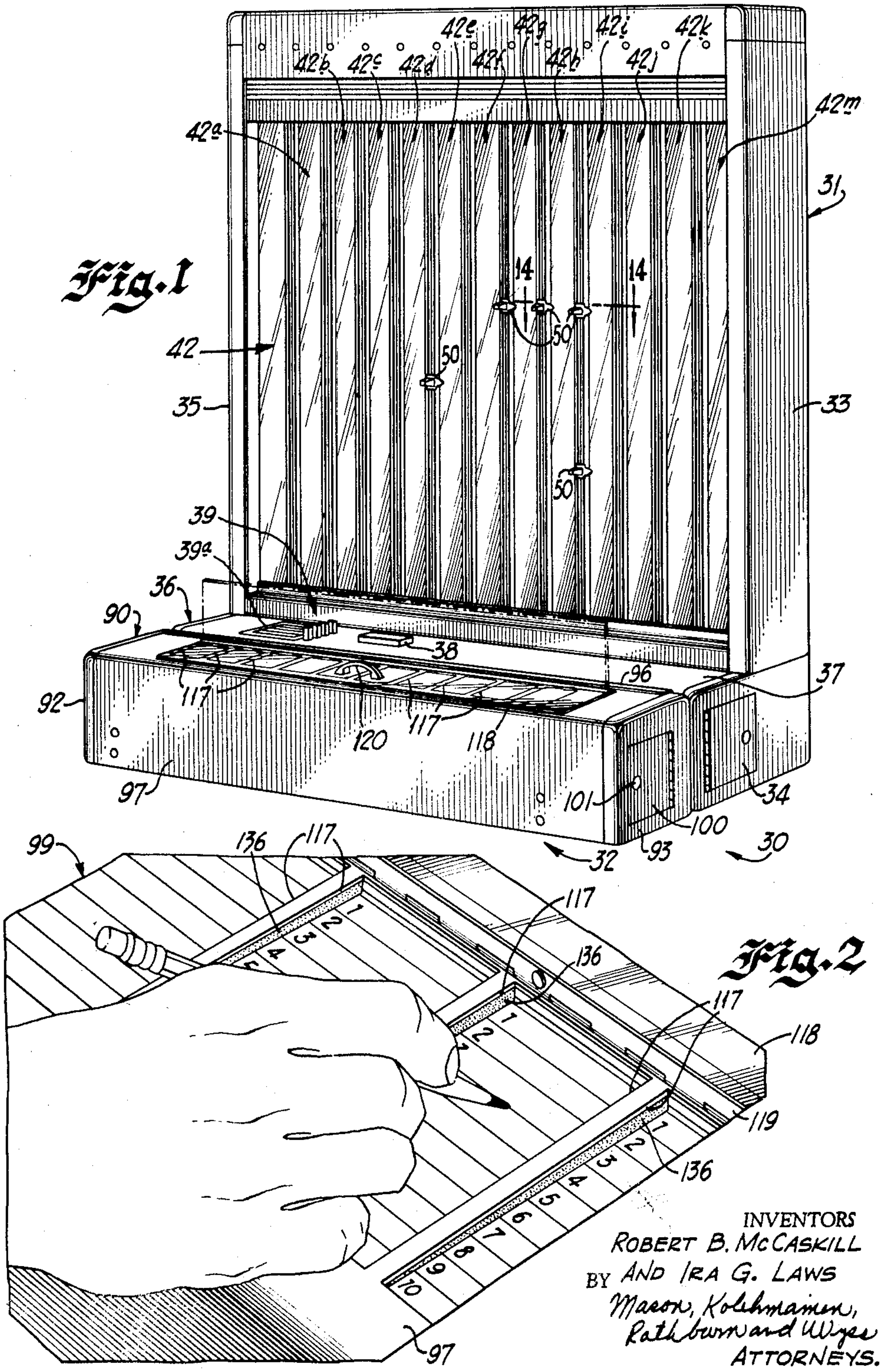
FIG. 1 is a perspective view showing a voting machine with write-in facilities and characterized by the features of the present invention.
FIG. 2 is an enlarged, fragmentary perspective view showing a voter making write-in entries on the write-in facilities of the voting machine shown in FIG. 1.

Referring now to the drawings and first to FIG. 1, a voting machine characterized by the features of the present invention is there identified generally by the reference numeral 30 and comprises a main voting machine 31 and a write-in attachment 32 detachably secured to the main machine. The main voting machine 31 includes a substantially enclosed housing 33 formed by a number of panels locked together in any suitable manner as, for example, by means of interlocks as described in detail and claimed in copending application Serial No. 120,249, now Patent No. 3,133,699, of Hugh H. Bright et al. filed on June 28, 1961, and assigned to the same assignee as the present invention. In the event that the voting machine breaks down or if, for any other reason, access may be desired to the interior of the housing 33, one or more of the panels may be removed by unlocking the appropriate key operated lock or locks. Moreover, access may be had by the precinct officials to the rear of the voting machine to read the counters after the election has been completed by unlocking and opening rear doors (not shown) in the manner described in the Bright et al. application referred to above. In addition, a power panel door 34 located on the right side of the machine as viewed in FIG. 1 may be unlocked and opened to permit connection of an electrical cable to a remote voter classification unit (not shown) as described and claimed in the above-identified copending application Serial No. 120,214, now Patent No. 3,098,607.

The housing 31 defines an upper, generally vertically extending voting panel section identified by the reference numeral 35 and a lower power supply section 36 extending forwardly from the upper section and forming a relatively low shelf 37 through which extends a manually operated "VOTE" switch 38. The lower section of the housing beneath the shelf 37 may also contain a party vote mechanism (not shown) of the type described and claimed in copending application Serial No. 120,251, now Patent No. 3,092,311, of Stanley W. Wilcox et al. filed June 28, 1961, and assigned to the same assignee as the present invention, which party vote mechanism may be operated by a plurality of switches 39 extending through the shelf 37 adjacent to party identification tabs **39*a*** as described in detail in the copending Wilcox et al. application.

Figures 14, 15, 16, 17:
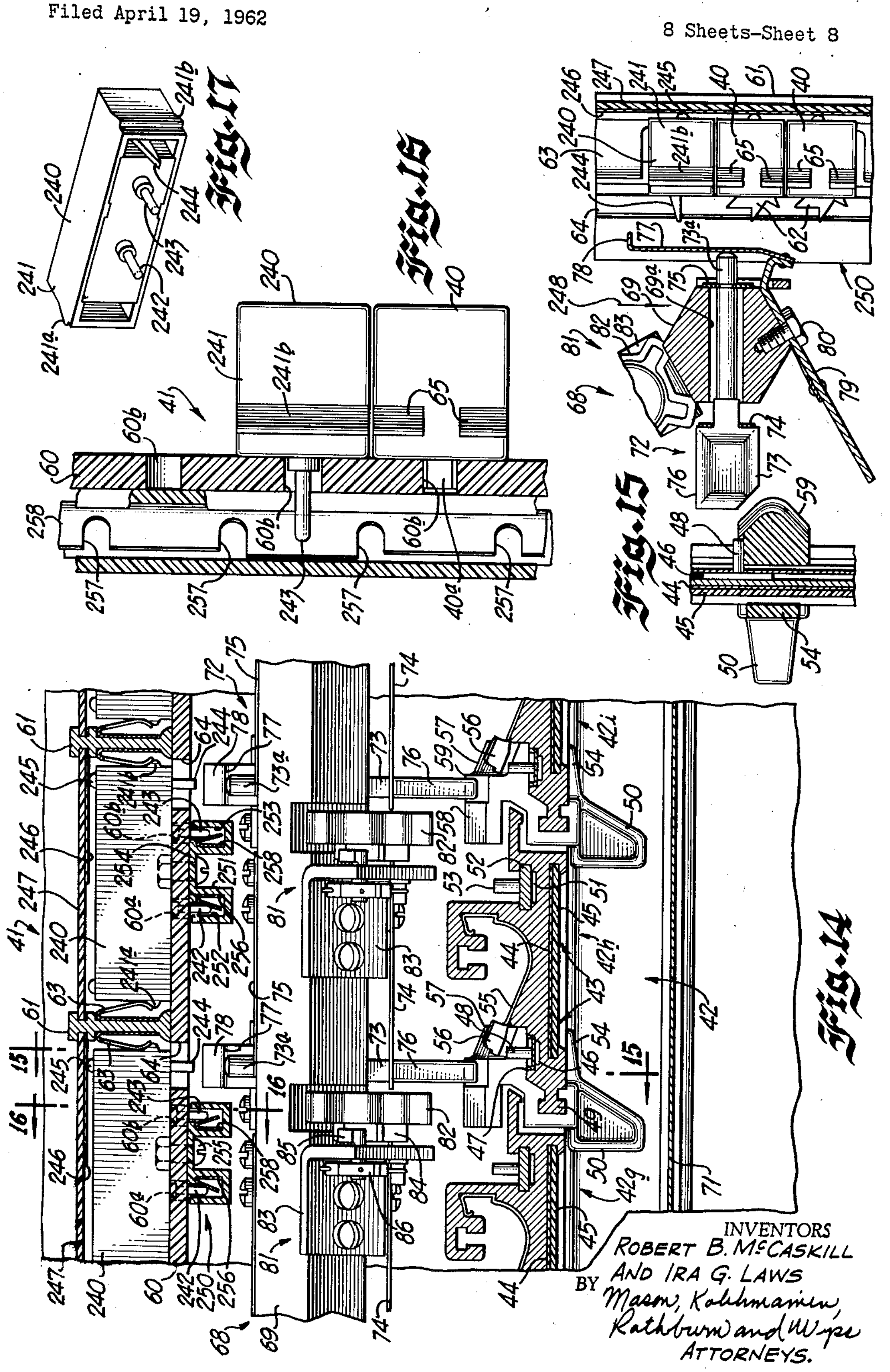
FIG. 14 is a fragmentary, sectional view taken along a line corresponding substantially to the line 14—14 in FIG. 1 and shows the voting keys and their support columns, the scanning mechanism including the counter actuators and key restoring means, and the counter panel including the vote recording counters and the ballot validating switches.
FIG. 15 is a fragmentary, sectional view taken along a line corresponding substantially to the line 15—15 in FIG. 14 assuming that the latter shows the entire voting machine construction.
FIG. 16 is an enlarged, fragmentary sectional view taken along a line substantially corresponding to the line 16—16 in FIG. 14 again assuming that the latter shows the entire voting machine construction.
FIG. 17 is a perspective view showing one of the detachable switch modules assembled upon the counter panel shown in FIGS. 14, 15 and 16.

The selections made by the voter are adapted to be recorded or registered upon counters 40 (FIGS. 15 and 16) located on a counter panel 41 (FIGS. 14 and 15) located at the rear of the voting machine. The front face or panel 42 of the upper section 33 is made up of a plurality of side by side vertically extending columns **42*a*, 42*b*, 42*c*, etc. While eleven vertical columns are shown, it will be apparent that this is merely for illustration since in actual practice any desired number of columns may be used. As is best shown in FIG. 14 of the drawings, each of the columns comprises an elongated member preferably formed of an extruded material such as aluminum. The extrusion is described in detail in the above-identified application Serial No. 120,281 and includes a channel 43 for receiving a printed or written candidate strip 44 containing different offices or propositions to be decided by the voter. Thus, for example, if the election is a national election, this strip may contain an office title such as "PRESIDENT" and therebeneath may appear the different candidates competing for this office. The office title and the candidates for the office will be referred to hereinafter as an "office group." However, it should be understood that the term "office group" may also refer to propositions on which a yes or no answer is required as, for example, on bond issues, constitutional amendments or the like. Each of the candidate positions in each office group will be referred to hereinafter as a voting position. Each of the channels 43 may also receive a transparent cover 45 overlying the printed candidate strip 44** for the purpose of preventing the latter strip from being marked or damaged by the voter using the machine.

A groove 46 is provided in the rear face of each column for receiving an elongated strip 47 having a series of vertically spaced openings therein accommodating office stops 48 which divide the different office groups of each column. Each office stop comprises a pin having a stem extending through one of the openings and protruding outwardly beyond the strip 47 and rearwardly of the column. Each column is further provided with an elongated, longitudinally extending guide rail 49 for accommodating one or more voting keys or selectors 50 which are slideable along the column to permit the voter to make his selections. In addition, each column is provided with a groove or slot 51 opening to the rear of the column for accommodating a second, perforated, elongated strip 52 carrying a plurality of detent release pins 53 located at spaced positions therealong to operate the key restoring mechanism in the manner described in detail in the copending application Serial No. 120,250, now Patent No. 3,095,142, of Edward J. Crossland et al. which is assigned to the same assignee as the present invention.

Each voting key 50 is adapted to be manually moved along its associated column between the two stops defining its office group but obviously the key cannot pass either of the stops. The key may be moved from the neutral or non-voting position located adjacent to the upper stop of its office group to any one of the three selecting or voting positions and as the key moves along the column an outer pointer or indicator 54 thereon passes over the names of the candidates on the strip 44. When the key reaches the position of the candidate selected by the voter, it is released. In a normal office group where only one selection can be made, the voter is provided with only one key and, as a consequence, it is not necessary to provide an interlock arrangement for preventing further voting in this office group. For group voting where more than one choice is to be exercised in a given office group, a number of voting keys are provided equal to the number of choices. If cumulative voting is not permitted, the names of the candidates in the latter group will appear only once and, hence, only one vote may be cast for any one candidate. However, if cumulative voting is permissible, that is, if the voter may cast more than one of his votes for a single candidate, then the names of the candidates will be listed in each office group more than once.

The number of selecting positions available in each of the columns is, of course, determined solely by the height of the column and the space occupied by each selecting position. Obviously, any suitable number of selecting positions may be provided but in one form of the present invention, thirty such positions were used and, hence, this number is shown in FIG. 1. The selecting positions of the columns *42a*, *42b*, *42c*, etc. are horizontally aligned to form different horizontal rows on the front panel of the voting machine with each row corresponding to a transversely extending row of positions on the counter panel 41.

As is described in detail in the copending application Serial No. 120,281 the voting keys are held in the neutral and voting positions by detent springs 55 mounted on each column. The detents are stacked closely together along the length of the column and each includes a laterally extending curved detent finger carrying at its outer end a key engaging portion 56. Each of the key engaging portions 56 is disposed in the path of sliding movement of the voting keys on the column and is bent to form a key holding notch between adjacent keys of the column. When a voting key is slid along the column to move over a detent finger, the finger is flexed rearwardly of the front panel 42 and if the key is stopped either at a voting position or at a neutral or non-voting position, it seats within one of the key holding notches and is thus resiliently held at the selected position with the adjacent detent fingers holding the key being disposed in their non-flexed positions. To provide a detent for each selecting position on the voting panel, the notches are separated by a distance corresponding to the width of one of the selecting positions and the detent fingers are so oriented with respect to the office stops 43 that when a voting key is in its neutral position it is also seated within a notch.

The voting keys 50 are described in detail in the copending application Serial No. 120,281, now Patent No. 3,108,744, identified above and each includes a curved detent engaging region 57 protruding rearwardly from the body portion of the key and shaped to flex the detent fingers during movement of the key along the column. The rearward portion of each key is also provided with a tooth 58 for use in restoring the key to its neutral position after the vote is cast. Finally, the rearward portion of the key is provided with a curved surface portion 59 for engaging the counter actuating mechanism.

After the voter has made his selections upon the voting panel of the machine, his choices are adapted to be recorded or registered upon the counters 40. As is shown in FIG. 14, the latter panel extends along the rear of the voting machine within the housing 33 and generally parallel to the front panel 42. The panel 41 comprises a large flat plate 60 carrying a plurality of elongated, spaced apart, parallel vertical ribs 61 defining a plurality of columns equal in number to the number of columns *42a*, *42b*, etc. of the front panel 42. As was indicated above, the panel 41 is adapted to support a plurality of the detachable counter devices 40, one such counter being used for each voting or selecting position employed for voting on the front panel 42. To this end, the panel 41 has a number of counter receiving positions thereon for receiving the counters and prior to the election counters are assembled on the panel only at receiving positions corresponding to the voting or selecting positions to be used during the election. No counters are inserted at positions corresponding to the neutral or non-voting positions of the voting keys and none are mounted at positions corresponding to the vacant positions on the front panel not used for the election. Along each column of the counter panel are provided pairs of holes *60a* and *60b* with the different pairs being spaced apart vertically as shown in FIG. 16 and with each pair being adapted to receive feet *40a* formed on each of the detachable plug-in counters 40. Each counter is of the type described and claimed in copending application Serial No. 120,241 of Hugh H. Bright filed June 28, 1961, and assigned to the same assignee as the present invention and, as a result, these counters will not be described in detail. Each column on the counter panel is also provided with an elongated vertical slot 64 formed in the plate 60 for receiving counter operating ratchets 62 (FIG. 15) of all of the counters mounted along that column. Elongated detent springs 63 are carried by the panel ribs 61 and each has a plurality of spring fingers cooperating with tabs 65 formed on opposite sides of the counter casing to hold the counters in position, each counter being held by one pair of spring fingers. Each counter is inserted into position on the counter panel by holding its casing at the top and bottom between the thumb and forefinger and by then pushing the counter past the detent spring fingers until the counter ratchet 62 extends through the slot 64 with the feet *40a* fitting into one pair of the openings *60a* and *60b*. The detent spring fingers snap over the tabs 65 to hold the counter in position.

The vote registering operation is initiated by the actuation of the manually operated "VOTE" switch 38 by the voter after he has completed his selections. The switch 38 is effective to complete an electrical circuit (not shown but described in the above-identified McCaskill application Serial No. 120,214, now Patent No. 3,098,607) to a series wound drive motor 66 (FIG. 3) having its output shaft connected through suitable reduction gearing and through a pair of sprocket and chain assemblies 67 to drive a scanning mechanism indicated generally by the reference numeral 68. When the "VOTE" switch 38 is operated, the scanning mechanism is located at the top of the voting machine and, hence, it is swept along the rear of the voting panel in a sensing or vote detecting direction and remains at the bottom of the panel until it is returned to the top at the start of the next voting cycle by the insertion of a properly positioned, valid voter identification card as is disclosed in the copending McCaskill application Serial No. 120,214 referred to above. During the return sweep of the scanning mechanism 68, the voting keys 50 are all returned from their voting positions to their neutral or non-voting positions ready for the next voter's selections. The drive for the scanning mechanism is described in detail in the copending application Serial No. 120,281, now Patent No. 3,108,744.

The scanning mechanism itself comprises a horizontal rail 69 having its opposed ends mounted for turning movement upon carriage assemblies 70 respectively carried by the vertically extending chains of the assemblies 67. The carriage assemblies are fixedly secured to the chains and are guided for vertical movement within suitable fixed guide channels provided along the sides of the voting machine housing 33.

Since the voting keys are retained in their voting positions on the front panel following completion of the vote registering operation, it is desirable, for the purpose of preserving the secrecy of the ballot, to cover the panel and the keys so that the key positions cannot be detected by the next voter using the machine. To this end, a flexible curtain or cover 71 (FIG. 1) may be lowered over the front panel 42 when the scanning mechanism 68 makes its vote sensing sweep. This curtain, when retracted, is stored within a curtain containing chamber at the rear of the voting panel section 35 but is extended by the downward movement of the scanning mechanism 68 to cover the front panel 42 as is described in detail in the above-identified application Serial No. 120,281, now Patent No. 3,108,744.

For the purpose of detecting the positions of the actuated or voted keys, that is, the keys which have been moved from a neutral position to a voting position, and for actuating those counters 40 corresponding to the positions of the voted keys, the rail 69 carries a plurality of spaced apart combined key wipers and counter actuating devices 72, there being one of these for each of the columns 42*a*, 42*b*, etc. The devices 72 are described in detail in the copending application Serial No. 120,281 but, briefly, each comprises an interposer arm 73 best shown in FIG. 15 extending through a transverse bore 69*a* in the rail 69 and suspended upon the latter rail for limited movement longitudinally of the bore 69*a* by means of leaf springs 74 and 75. During the vote sensing sweep of the scanning mechanism 68, the forward or wiping end 76 of the interposer arm is positioned to engage the curved area 59 on each of the voting keys 50 in its associated column 42*a*, 42*b*, etc. Thus, when the scanning mechanism 68 is moved downwardly along the rear of the panel 42, the interposer arm 73 is moved to the right as viewed in FIG. 15 each time that the wiping end 76 engages a voting key 50, the interposer arm being returned to the left by the springs 74 and 75 as soon as the wiping end has moved past the key. The described movement of the arm 73 is used to actuate the counters 40 since the rearward end 73*a* of the arm is in engagement with a counter actuating arm 77 having a hooked end 78 which is adapted to engage and turn the ratchet 62 of any counter 40 located in a position on the panel 41 corresponding to the position of a voted key. More specifically, the actuating arm 77 is carried upon one end of a support bar 79 which is mounted for pivotal movement about a pivot screw 80 on the rail 69 for a purpose which will be evident from an understanding of the operation of the voting machine disclosed in the copending application Serial No. 120,281, now Patent No. 3,108,744.

When the scanning rail 69 approaches the end of its vote detecting sweep, it is turned 60 degrees in a counterclockwise direction from the position shown in FIG. 15 in order to condition it for the upward key restoring sweep. The turning of the rail moves the interposers or wipers to positions where they cannot engage the voting keys during the return of the rail. However, when the rail 69 is turned, a plurality of key restoring devices 81, one for each of the counter actuating devices 72, are positioned to engage the tooth 58 on each voting key as the rail is raised. One such key restoring device is provided for each column containing voting keys and each device is effective to lift all of the voting keys in its associated column from the detent fingers holding them in the voting positions and to slide each key upwardly along the column until it is returned to its neutral position where its upward movement is limited by one of the office stops 48. Each key restoring device includes a toothed cog 82 mounted for rotation upon an L-shaped bracket 83 secured to the rail 69 and each cog is provided with any desired number of teeth provided only that the interdental spaces between adjacent teeth is sufficient to permit the cog to turn over the tooth 58. Formed integral with each cog at one side thereof is a toothed detent wheel 84 cooperating with a detent 85 to positively lock the cog in position while the latter is performing its key lifting or restoring function. The detent 85 comprises a pawl extending transversely from a stub shaft mounted on the bracket 83 and the free end of the pawl engages the periphery of the detent wheel 84. The shaft also supports a detent release arm 86 disposed to successively engage all of the release pins 53 of the associated column during the key restoring sweep of the scanning mechanism 68 as is described in detail in the copending application Serial No. 120,281. The detents 85 of the different key restoring devices 81 operate independently of each other and each is effective to prevent turning of its associated cog 82 until it is released by engagement of its release arm 86 with one of the pins 53. Thus, the positions of the release pins 53 along the columns determine when the cogs 82 will be released to turn. When the scanning rail 69 is raised at the start of the key restoring sweep, all of the cogs 82 will be held against rotation with one of the cog teeth extending substantially horizontally towards the front panel 42 and in position to engage the tooth 58 on the lowermost voting key in the associated column. Thus, when the latter key is engaged by the horizontal cog tooth, the continued upward movement of the rail 69 is effective to lift the key and this action occurs along each column although obviously the lowermost voting keys of the different columns are not likely to be located in the same voting positions and, as a result, the key restoring devices 81 usually engage these lowermost keys at different times. In any event, each key is lifted until it approaches the neutral position where it will rest either against one of the office stops 48 or against another key in the neutral position. The release pins 53 are disposed along the column at positions corresponding to the neutral positions of the keys and, hence, when each key approaches its neutral position, the release arm 86 of its associated key restoring device engages a pin 53 whereupon the detent 85 releases the detent wheel 84, thus permitting the cog 82 to turn over the tooth 58 on the voting key to pass over this key. After each voting key has been raised to seat against its stop (or against another key in neutral position), it is held in the neutral position by engagement of its portion 57 with the detent spring notch corresponding to its neutral position. When the scanning rail approaches the top of the panel at the end of its key restoring sweep, it is turned from the key restoring position back to the scanning or vote sensing position shown in FIG. 15.

In accordance with the present invention, the write-in attachment 32 is adapted to be secured to the main voting machine 31 in order to permit the voter to make write-in entries for candidates not listed on the front panel 42. Since in many jurisdictions and in some elections no write-in facilities are necessary, the write-in attachment 32 may be easily removed from the voting machine, if desired. Thus, a jurisdiction which does not require a voting machine with write-in facilities need not purchase the attachment 32 and, hence, the cost of the voting machine for such a jurisdiction can be materially reduced. The write-in attachment 32 includes a substantially enclosed housing 90 formed by a bottom or base plate 91 (FIGS. 7, 8 and 9) to which are secured a pair of rigid side plates 92 and 93 (FIG. 1). The housing 90 is completed by a rear plate 94 cooperating with an L-shaped striker bar 95 to form a rear cover for the housing and by a combined front and top cover 97 of generally L shape hinged to the striker bar 95 by means of hinges 96. The lower front end of the combined front and top cover 97 is normally latched to the base plate 91 by a latch mechanism 98 described more fully hereinafter and best shown in FIGS. 7 and 8. The latch mechanism 98 may be released to permit the cover 97 to be pivoted upon the hinge 96 in a clockwise direction as viewed in FIG. 8 so that access may be had to the interior of the housing 90 for the purpose of maintenance or repair of the components within the housing or to insert or remove the write-in ballot paper identified by the reference numeral 99 in FIGS. 2, 6, 7, 8, 10, 12, 13, 18, 19, 20 and 21 of the drawings. Access to the latch 98 may be had through an opening 93*a* (FIG. 9) in the side plate 93 which opening is normally covered by an access door 100 (FIGS. 1, 4 and 9) hingedly mounted on the side plate. The latter door is locked in the closed position during the course of an election by means of a key operated lock 101, the key for which is normally retained by a precinct official so that the ballot sheet can be removed to count the write-in entries at the completion of the election. The latch mechanism 98 may take any suitable form, but as shown it comprises a rod-like member 102 pivotally supported on the lower front edge of the cover 97 and having a pair of dog engaging portions 103 (FIG. 8) and 104 (FIG. 7) for respectively engaging a pair of latching dogs 105 and 106. An operating handle for turning the rod 102 is provided near the opening 93*a*, but this is not shown in the drawings since the handle can take any conventional form. When the latch rod 102 is in the position shown in FIGS. 7 and 8, the portions 103 and 104 engage the dogs 105 and 106 to hold the cover 97 in the closed position but when the rod 102 is pivoted in a clockwise direction as viewed in FIG. 8 the portions 103 and 104 are moved away from the latching dogs 105 and 106 so that the cover may be swung upwardly about the hinges 96. The dogs 105 and 106 are secured to a pair of spaced apart, rigid, relatively thick interior walls or partitions 107 and 108, respectively, both of which are fixedly secured to the base plate 91 by means of L-shaped support brackets like the bracket 109 shown in FIGS. 7 and 9. The rigid striker bar 95 and the rear cover 94 referred to above are also secured to the partitions 107 and 108 by means of screws like those shown in FIG. 4.

Figures 6, 19:
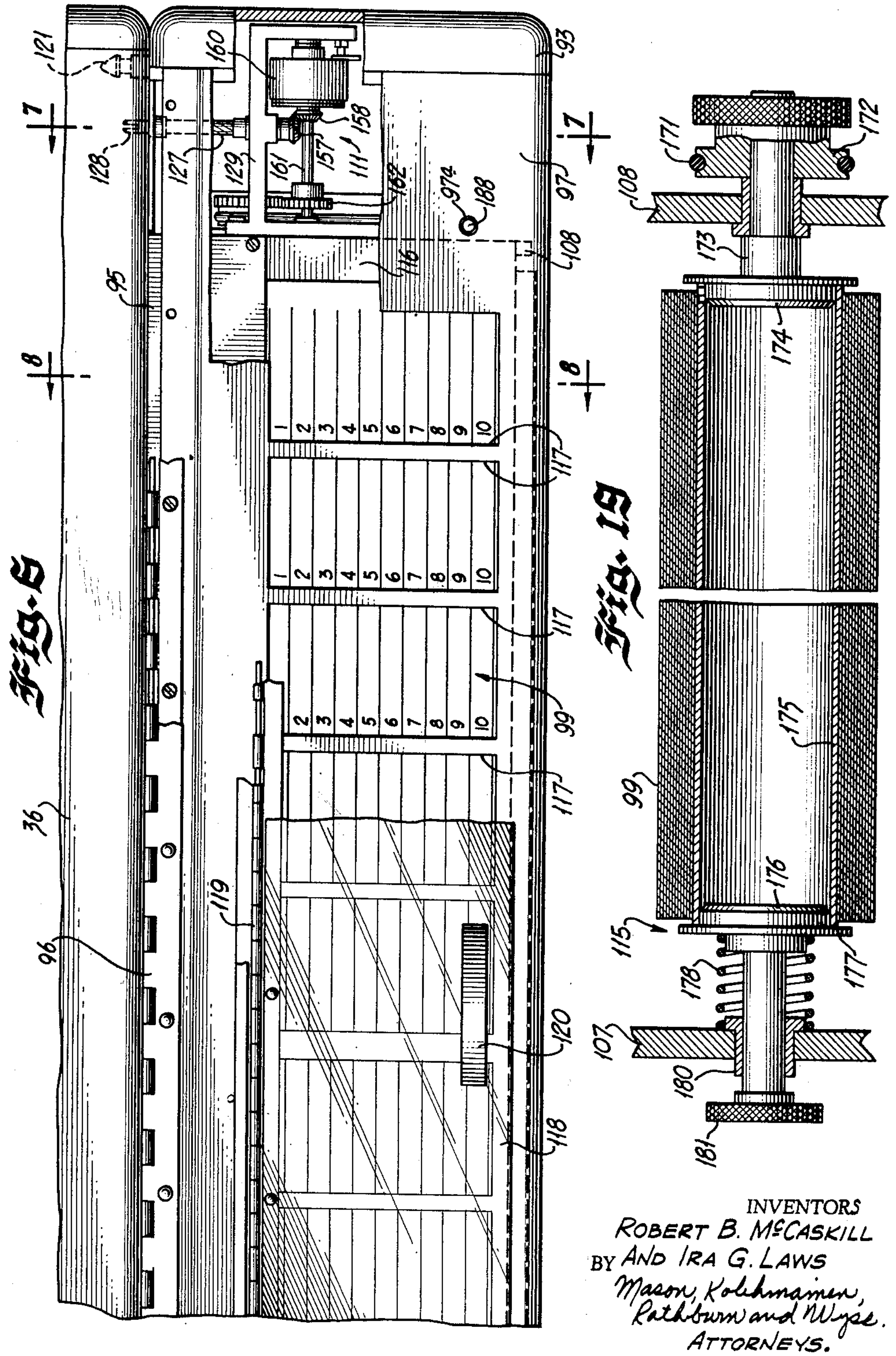
FIG. 6 is a fragmentary, top plan view of the write-in attachment and a small portion of the main voting machine housing with several parts being broken away to show certain details of construction.
FIG. 19 is a fragmentary, sectional view showing particularly the mounting for the take-up roll for the write-in ballot and taken along a line corresponding substantially to the line 19—19 in FIG. 8 again assuming that the latter shows the entire construction.
Figures 7, 18:
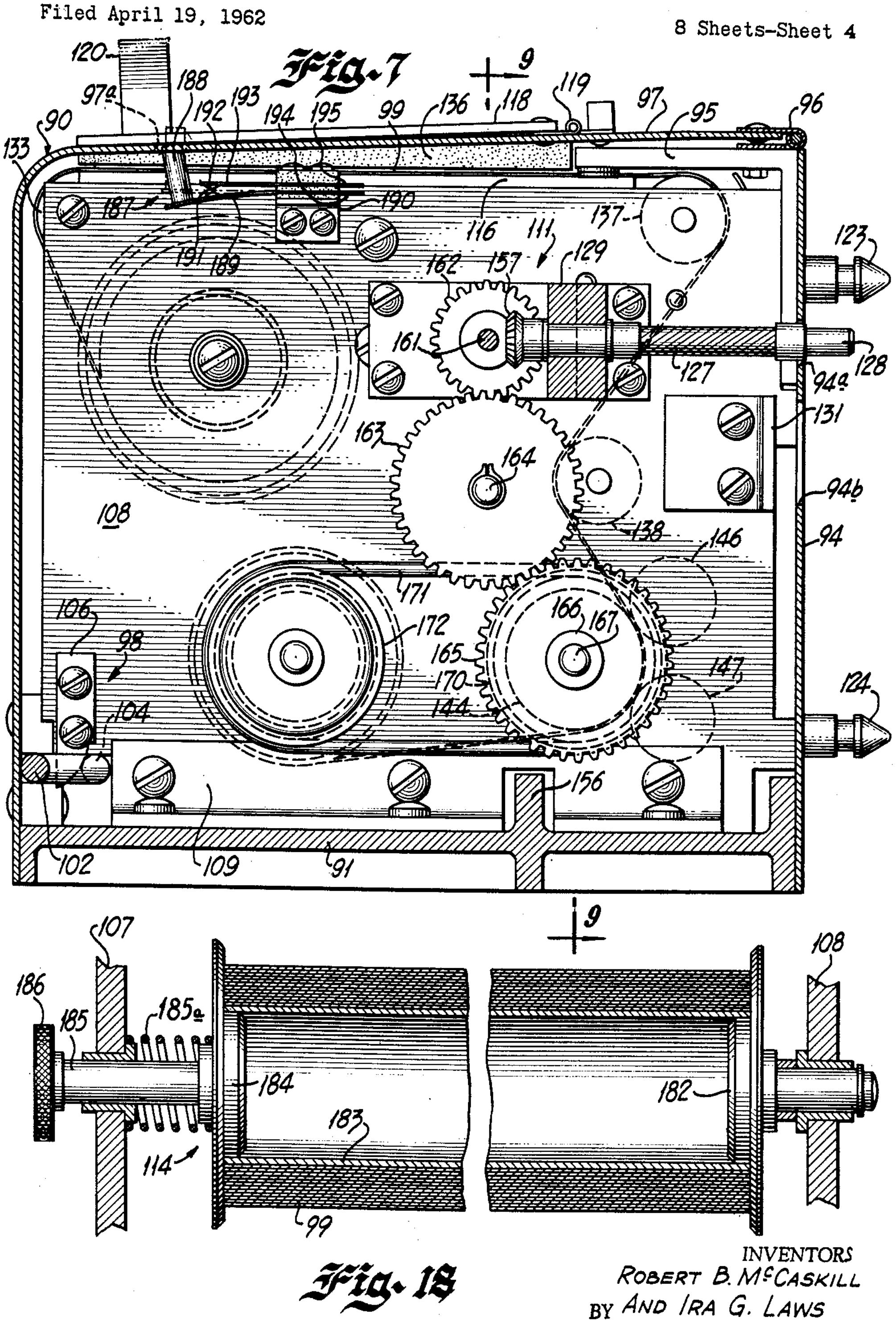
FIG. 7 is a sectional view taken along a line corresponding substantially to the line 7—7 in FIG. 6 and shows particularly the drive for the write-in ballot.
FIG. 18 is a fragmentary, sectional view showing particularly the mounting for the supply roll of the write-in ballot and taken along a line corresponding substantially to the line 18—18 in FIG. 8 assuming that the latter shows the entire construction of the write-in attachment.
Figures 8, 20, 21:
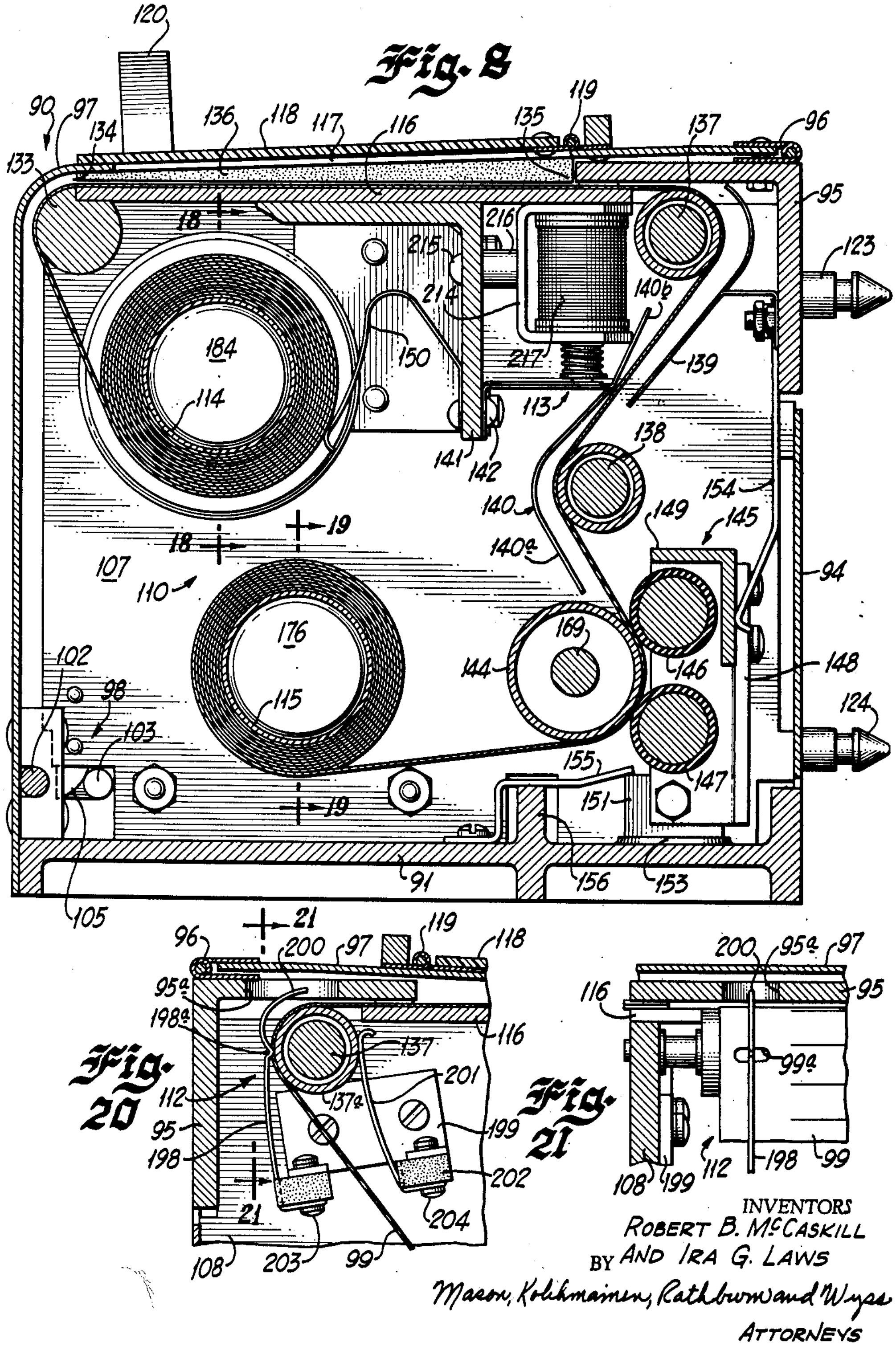
FIG. 8 is a sectional view taken along a line substantially corresponding to the line 8—8 in FIG. 6 and shows particularly the feed mechanism for directing the write-in ballot sheet from its supply roll to its take-up roll.
FIG. 20 is a fragmentary, sectional view showing particularly the ballot sheet controlled switch and taken along a line corresponding substantially to the line 20—20 in FIG. 9 assuming again that the latter shows the entire construction.
FIG. 21 is a fragmentary, sectional view taken along a line corresponding substantially to the line 21—21 in FIG. 20.
Figure 9:
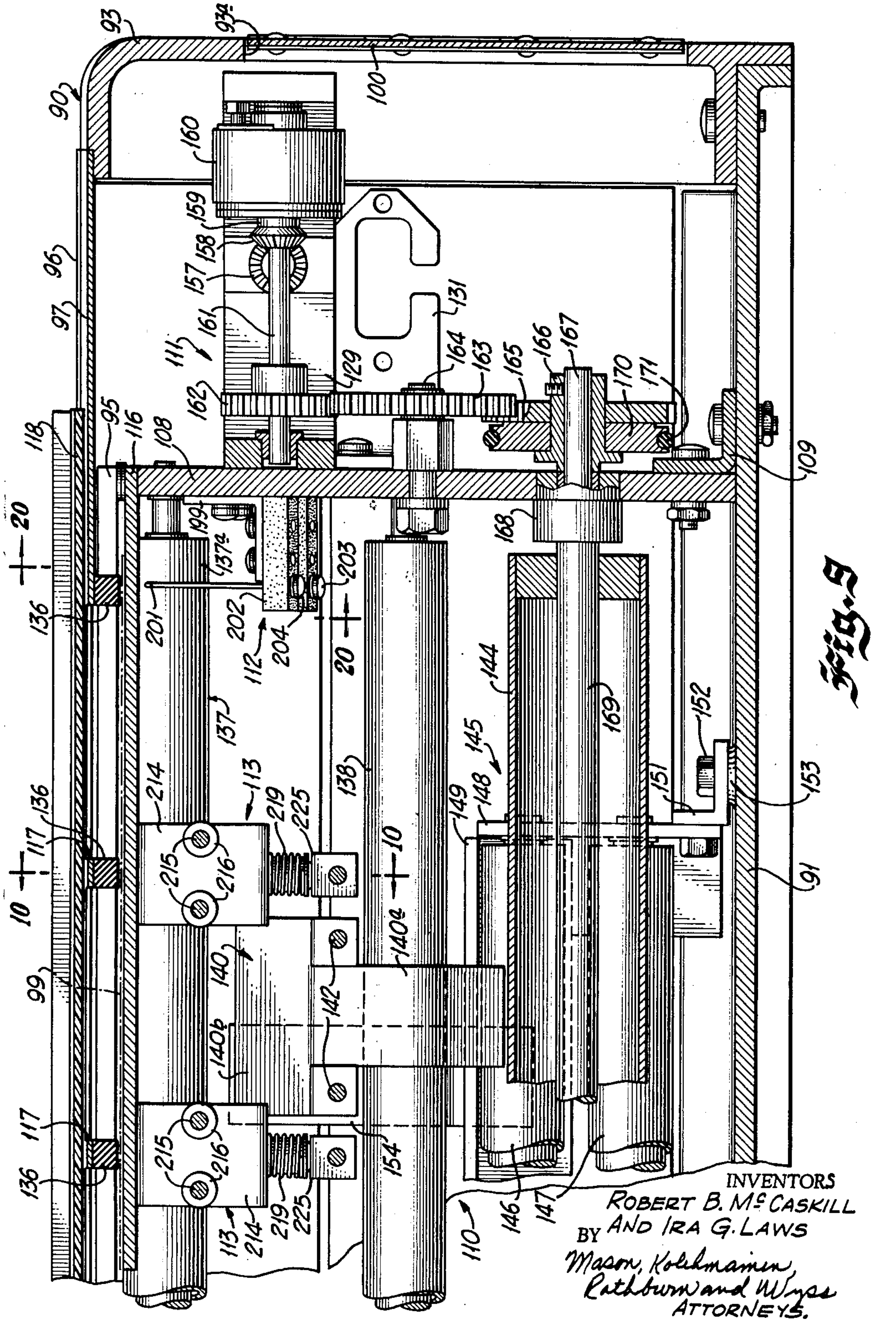
FIG. 9 is a fragmentary, sectional view of the write-in attachment with the ballot sheet removed and taken along a line corresponding substantially to the line 9—9 in FIG. 7 assuming, of course, that the latter shows the entire construction.
Figures 10, 11, 12:
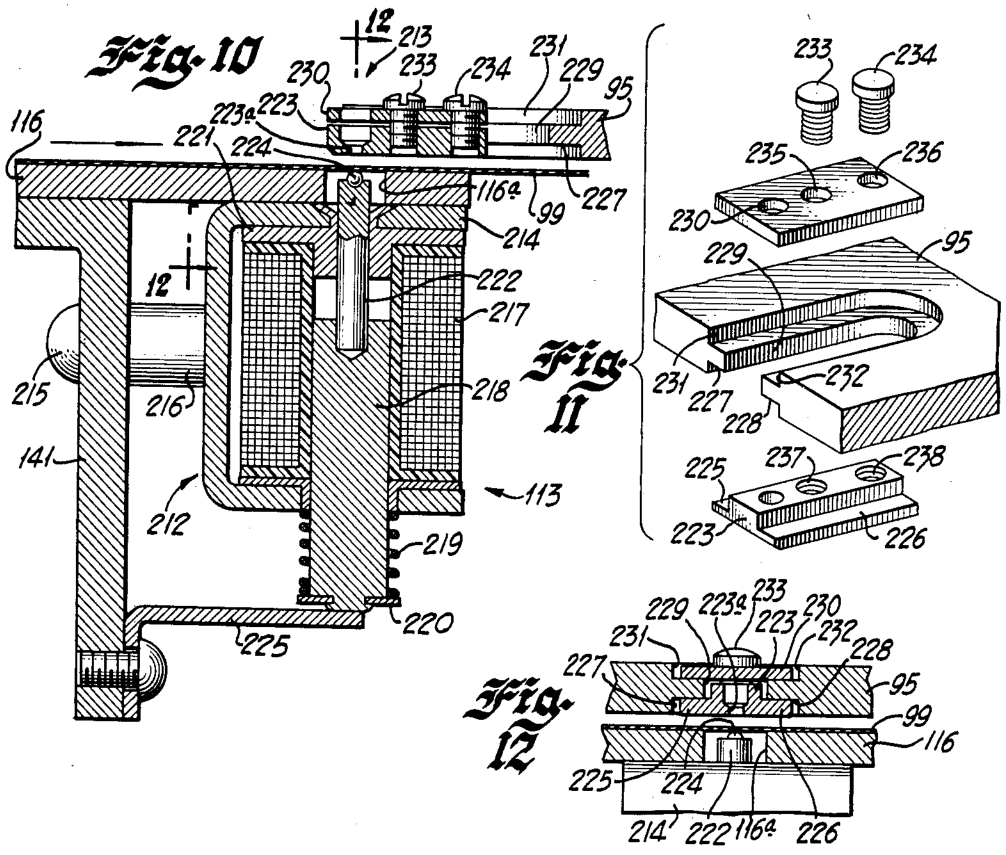
FIG. 10 is an enlarged fragmentary sectional view taken along a line substantially corresponding to the line 10—10 in FIG. 9 and shows particularly one of the solenoid operated punches for validating the write-in ballot.
FIG. 11 is an exploded, fragmentary perspective view showing the mechanism for adjusting the female die member of the punch illustrated in FIG. 10.
FIG. 12 is a fragmentary, sectional view taken along a line corresponding substantially to the line 12—12 in FIG. 10.
Figure 13:
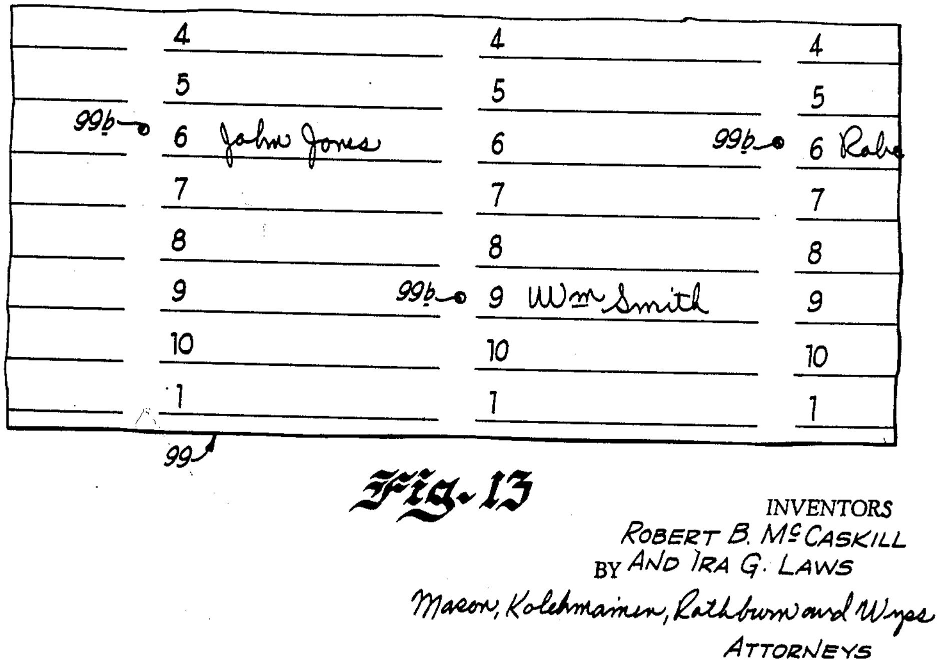
FIG. 13 is a fragmentary view of a small portion of the write-in ballot sheet with a few validated write-in entries.

The component elements within the housing 90 comprise a ballot paper support and feed mechanism indicated generally by the reference numeral 110 and best shown in FIGS. 8 and 9 of the drawings, a ballot paper drive mechanism indicated generally by the reference numeral 111 and best shown in FIGS. 6, 7 and 9 of the drawings, a ballot paper controlled switch mechanism 112 best shown in FIGS. 20 and 21 of the drawings, and a set of write-in ballot validating devices 113, best shown in FIGS. 8, 9 and 10. The ballot paper supply and feed mechanism 110 and its associated drive mechanism 111 cooperate to advance the write-in ballot 99 from a supply roll 114 to a take-up roll 115 over a write-in board or platform 116 secured to the top portions of the partitions 107 and 108. The write-in board 116 extends beneath a plurality of side by side openings 117 in the top of the cover 97 there being one such opening for each column of ballot spaces on the ballot sheet 99. The openings 117 and the portion of the ballot sheet 99 exposed therebeneath are normally covered by a single, preferably transparent, door 118 hingedly mounted upon the top of the cover 97 by means of hinges 119. A handle 120 is attached to the door 118 so that the voter can raise the door whenever he desires to make one or more entries on the write-in ballot 99. With the door 118 in the open position shown in FIG. 2, the voter has access to all of the exposed portions of the ballot sheet 99 so that he can make the desired write-in entries using a pen or pencil in the usual manner as is clearly shown in FIGURE 2. The ballot paper 99, as is best shown in FIGS. 2, 6 and 13, contains a plurality of side by side columns of write-in spaces, the number of columns being equal to the number of columns of the voting panel 42 in use for voting purposes and, in the example described above, ten such columns are provided since the columns at the opposed sides of the main voting machine are not used. The ballot paper extends across a major portion of the width of the voting machine and is perforated along the right edge thereof as indicated by the reference numeral 99*a* in FIGS. 20 and 21. The perforations 99*a* are spaced uniformly apart in a direction extending longitudinally of the ballot paper and the spacing between adjacent perforations is equal to the length of one voting segment of the ballot paper, a voting segment being defined as the length of the paper extending beneath each of the openings 117. Each voting segment, as was indicated above, is divided into a plurality of side by side columns with each such column being divided into a suitable number of write-in spaces and, in the voting machine previously described where thirty horizontal selecting positions are provided along each column of the voting machine 31, it has been found that ten ballot spaces along each column of each voting segment is sufficient. The ten ballot spaces in each write-in column are numbered from 1 to 10 in FIGS. 2 and 13. Each ballot space corresponds to a candidate or office group on the front panel 42 of the voting machine and, thus, to make the write-in entries, the voter is required to use the space corresponding to the particular office group in which the write-in is desired. A numbered strip located above the columns on the write-in ballot, for example, on the hinge 119 identify the columns and correspond with similar numbers on the columns 42*a*, 42*b*, etc. so that the voter may select the proper column for making the desired write-in. For convenience the different office groups along each column of the front panel 42 may be numbered to correspond with the numbers appearing on the write-in ballot spaces so that the voter can easily identify the proper write-in space to use.

As was indicated above, the write-in attachment 32 is adapted to be detachably secured to the main voting machine 31 and, to this end, it is provided with a pair of rearwardly extending posts or studs 121 and 122 mounted on the side plate 93 (FIG. 4) and a similar pair of studs 123 and 124 mounted on the side plate 92 as is shown in FIGS. 7 and 8 of the drawings. These studs are adapted to fit within suitable clamping sockets mounted on the front of the power supply section 36 of the main voting machine within the housing 33 but the sockets are not shown in detail in the drawings. The sockets are provided with suitable spring operated clips or the like which snap over the heads of the studs 121, 122, 123 and 124 to hold the write-in attachment firmly in position on the voting machine housing.

Figure 3:
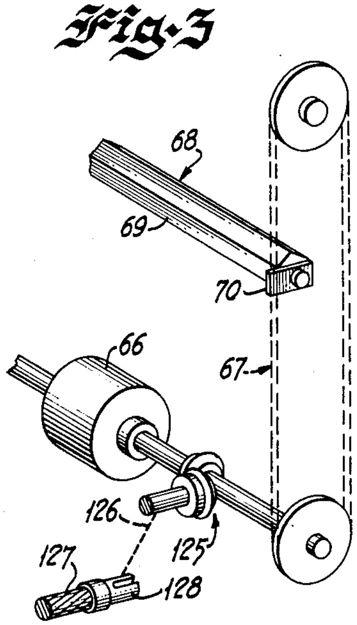
FIG. 3 is a fragmentary, schematic view illustrating the drive connection between the scanning mechanism of the voting machine and the drive for the write-in ballot.
Figure 4:
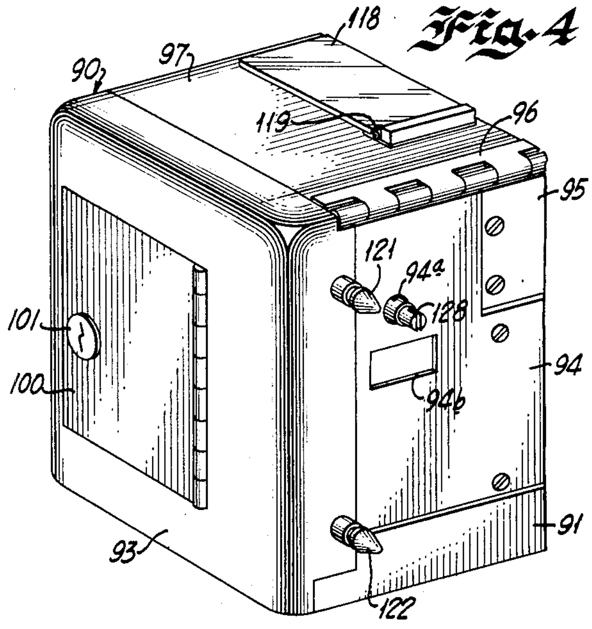
FIG. 4 is a fragmentary, perspective view showing one end of the write-in attachment.

The write-in ballot drive mechanism 111 is driven in synchronism with the scanning mechanism 68 of the main voting machine and, to this end, the output shaft of the drive motor 66 for the scanning mechanism is connected through suitable power take-off gears indicated in FIG. 3 by the reference numeral 125 and through a suitable mechanical connection represented by the broken line 126 to drive an input shaft 127 for the drive mechanism 111. The mechanical connection 126 may include reduction gearing and, in addition, it may include a flexible drive shaft extending to a position adjacent the upper right corner of the power supply section 36 as viewed in FIG. 1. The flexible shaft is provided with a suitable connector (not shown) which fits within a bifurcated end connector 128 (FIGS. 3, 4 and 6) which is mounted on the end of the input shaft 127. As is best shown in FIGS. 4 and 7 of the drawings, the connector 128 extends through an opening 94*a* in the rear plate 94 and provides a detachable connection between the paper drive mechanism 111 and the drive for the scanning mechanism 68. The input shaft 127 is also flexible and is journaled for rotation upon bearings carried by a bracket 129 affixed to the partition 108. Provision is also made for electrically connecting the main voting machine 31 and the write-in attachment 32 and, to this end, a suitable connector plug consisting of the usual male and female members is provided between the main voting machine and the write-in attachment. This connector is identified by the reference numeral 130 in FIG. 5. The plug 130 and the electrical connectors wired thereto have been omitted from the mechanical drawings in FIGS. 1 to 4, inclusive, and FIGS. 6 to 21, inclusive, since the manner in which the wires are connected and disposed within the housing 90 per se forms no part of the present invention and can be made in any suitable manner. In any event, the plug member on the write-in attachment is carried by a bracket 131 secured to the wall 108 and shown in FIGS. 7 and 9 of the drawings. This plug member is aligned with an opening 94*b* in the rear cover 94 and shown in FIGS. 4 and 7 so that the plug member will mate with the cooperating plug member on the main voting machine housing when the write-in attachment is snapped into position in the manner described above.

Turning now to the paper supply and feed mechanism 110 and referring particularly to FIGS. 8 and 9 of the drawings, it will be observed that the ballot paper 99 extends from the supply row 114 over a guide shoe 133 supported for rotation upon the upper front corner of the walls 107 and 108. The write-in paper 99 then extends through a front guide slot 134 defined between the front edge of the board 116 and the cover 97 and, from this slot, the paper passes over the upper face of the board 116 and through a rear guide slot 135 defined between the rear edge of the board 116 and the underface of the striker bar 95. A plurality of pads 136 formed of a suitable hard plastic are secured to the underface of the cover 97 in the vicinity of the guide slots 134 and 135 in order to press the write-in paper firmly against the board 116, thereby to prevent crinkling or bunching of the paper in the write-in segments exposed to the voter. The write-in paper 99 emerging from the rear slot 135 passes over a second idler roller 137 also supported for rotation upon the walls 107 and 108 and the paper is then trained over a third guide roller 138 mounted upon these walls.

One or more paper guides 139 are secured to the striker bar 95 adjacent the roller 137 to guide the paper and, hence, to facilitate loading. Additional guides 140 are provided adjacent the roller 138 and these are supported upon a rigid, elongated rib 141 affixed to the upper edges of the walls 107 and 108 and extending therebetween. As is described in detail hereinafter, the rib 141 also serves to support the validating devices 113 and, in addition, it suports one or more springs 150 having a free, resilient end acting against the paper on the supply roll 114 to inhibit undesired unwinding of the paper. The guides 140 are secured to the rib 141 in any suitable manner as for example by means of machine screws 142 and each guide 140 includes a downwardly extending curve portion **140*a* disposed adjacent the roll 138 and an upwardly bent guide leaf 140*b* extending towards the guide roll 137. The ballot paper 99 passes from the idler roller 138 over a driven roller 144 and then to the take-up spool 115. The rollers 144 and 115 are both driven by the paper drive mechanism 111 described more fully hereinafter with the take-up roller being slightly overdriven to keep the paper taut. The paper is urged against the driven roller 144 by means of a pressure roller assembly indicated generally by the reference numeral 145 in FIGS. 8 and 9 and comprising a pair of pressure rollers 146 and 147 mounted upon a pair of end brackets 148, which brackets are interconnected by an angle bar 149 to form a rigid support structure for the two pressure rollers. The end limited brackets are secured to an angle support 151 mounted for movement upon the base plate 91 toward the left or right as viewed in FIG. 8. To permit the described limited movement of the pressure assembly 145, the angle support 151 is secured to the base casting via a screw 152 extending through an elongated slot (not shown) in the angle support and threaded into a tapped opening in a raised boss 153 formed on the base plate. One or more springs 154 (FIG. 8) are secured to the striker bar 95 and act against the angle bar 149 to urge the pressure roller assembly 145 towards the left as viewed in FIG. 8, thus biasing the pressure rollers 146 and 147 against the driven roller 144. A paper guide 155 having one end secured to the base plate 91 and having the other end extending over an upstanding rib 156 on the plate guides the paper 99 from the driven roller towards the take-up spool 115. Thus, during loading the paper 99 can be threaded from the supply spool 114** over the various rollers and guides to the take-up spool.

Turning now to the drive mechanism 111, it will be observed from the foregoing description that this mechanism serves to drive the roller 144 and the take-up spool 115 in order to advance the write-in ballot paper 99 from the supply spool 114 over the write-in board 116. To this end, the drive mechanism 111 includes, in addition to the flexible input shaft 127 described above a pair of meshing miter gears 157 and 158 (FIGS. 6 and 9), the gear 157 being driven by the input shaft and the gear 158 being mounted upon an input member 159 of a conventional electrically operated magnetic clutch supported upon the bracket 129. The output shaft 161 of the magnetic clutch is journaled for rotation upon the bracket 129 and supports a drive gear 162 which meshes with a second gear 163 varried by a stub shaft 164 journaled for rotation upon the wall 108. The gear 163 meshes with a drive gear 165 for driving the roller 144 and to this end the gear 165 is mounted upon a hub 166 which is secured to a short shaft 167 journaled by bearings carried upon the wall 108. The latter shaft is actually a reduced diameter portion of a shaft 169 supporting the driven roller 144. A one-way clutch 168 prevents the roller 144 from being driven in the reverse direction and thus insures that the paper can only be advanced from the supply spool 114 to the take-up spool 115. A drive sheave 170 mounted on the hub 166 is connected through an endless belt 171 to drive a similar sheave 172 (FIG. 19) for the take-up spool 115. More specifically, the sheave 172 is mounted upon a shaft 173 journaled for rotation upon the wall 108 and carrying at its inner end a spool holder 174 which is pinned or otherwise secured to a paper support spool 175. The other end of the spool or cylinder 175 receives a second spool holder 176 having an annular collar 177 thereon which is biased against the end of the cylinder 175 by means of a coil spring 178 acting between the spool holder 176 and the wall 107. The spool holder 176 is carried upon a stub shaft 179 extending through a bearing assembly 180 and carrying on its outer end a knurled head 181. Thus, the cylinder 175 may be inserted when empty at the beginning of an election or may be removed when containing the ballot paper at the completion of the election by first opening the cover 97 in the manner described above and by then grasping the knurled head 181 to move the spool holder 176 to the left as viewed in FIG. 19. As best shown in FIG. 18 of the drawings, the support for the supply spool 114 is similar to that for the take-up spool and includes a relatively fixed spool holder 182 journaled for rotation upon the wall 108 and supporting one end of a cylinder 183. A relatively movable spool holder 184 is inserted into the other end of the cylinder 183 and is normally urged toward the right as viewed in FIG. 18 by a coil spring **185*a* acting between the wall 107 and the movable spool holder. The spool holder 184 is mounted upon a shaft 185 journaled for rotation upon the wall 107 and having a knurled head 186 at the outer end thereof to permit movement of the spool holder 184 during insertion or removal of the cylinder 183** in a manner which is believed to be obvious.

In view of the foregoing description, it will be observed that, when the flexible input shaft 127 is driven, the gears 157 and 158 and the clutch input number 159 are turned. If the clutch 160 is energized, the shaft 161 and the gears 162, 163 and 165 are rotated to drive the roller 144. The sheave 172 is rotated by the belt 171 to drive the take-up spool 115 and, since the diameter of the sheave 172 is slightly greater than that of the sheave 170, the take-up spool is overdriven to keep the paper 99 taut. The oneway clutch 168 insures that the drive roller 144 will be rotated to advance the ballot paper 99 only when the scanning rail 69 is moved in its vote sensing direction and, as a result, the reverse or key restoring sweep on the scanning rail has no effect on the operation of the write-in attachment. However, in order to prevent excessive use of the write-in paper and, hence, to avoid the necessity for an extremely large write-in attachment, it is desirable that the write-in paper be advanced only if the voter has used the write-in facilities. To this end, the magnetic clutch 160 is effective to provide a drive connection from the member 159 to the shaft 161 only if the cover 118 has been raised by the voter during the voting operation. To provide the desired interlock between the electrically operated clutch 160 and the cover 118 there is provided a door operated interlock switch, identified by the reference numeral 187 in FIG. 7 of the drawings. The switch 187 comprises an operating tab or button 188 aligned with an opening **97*a*** in the top of the cover 97 and mounted upon a resilient switch arm 189 carried by a switch support 190 affixed to the wall 108. The arm 189 carries a contact 191 engageable with a second contact 192 mounted on a fixed arm 193 which extends outwardly from the switch support 190. When the cover 118 is in the closed position as shown in FIG. 7, it engages the tab 188 to hold the arm 189 in the flexed position so that the switch contacts 191 and 192 are open. However, when the cover is raised in the manner previously described, the resilient arm 189 moves upwardly to the position shown in broken lines in FIG. 7 so that the contacts 191 and 192 engage. These contacts are connected through the switch arms 189 and 193 and through switch terminals 194 and 195 to the electrical circuits for controlling the operation of the clutch 160 in the manner shown in FIG. 5. This electrical circuit includes, in addition to the switch 187, a pair of relays 196 and 197 which are mounted within the write-in attachment housing 90 at the left end thereof as viewed in FIG. 1 but are not shown in any of the drawings. The relay 196 has a set of normally closed contacts *196a* while the relay 197 includes a pair of normally open contacts *197a* and *197b*, the purpose of which will become apparent as the description proceeds.

The electrical circuit further includes the ballot paper controlled switch 112 referred to above for controlling the starting and stopping of the paper drive mechanism 111. The paper drive switch comprises a flexible brush 198 mounted upon a switch bracket 199 secured to the wall 108 and this brush 198 is provided with an inwardly bent wiping notch *198a* and a curved upwardly extending finger 200 extending within an opening *95a* in the striker bar. The switch 112 further comprises a second brush 201 having its free end biased into engagement with a conducting cylinder *137a* on the exterior of the idler roll 137. The brush 201 is supported upon an insulating block 202 carried by the bracket 199 and electrical connections to the switch 112 are made via terminals 203 and 204 carried on the insulating block. Normally the write-in paper 99 is disposed between the wiping notch *198a* and the metal cylinder *137a* to break the electrical circuit between the terminals 203 and 204 but when the notch *198a* enters one of the perforations *99a* in the write-in ballot, the electrical circuit between these two terminals is completed to close the switch.

Figure 5:
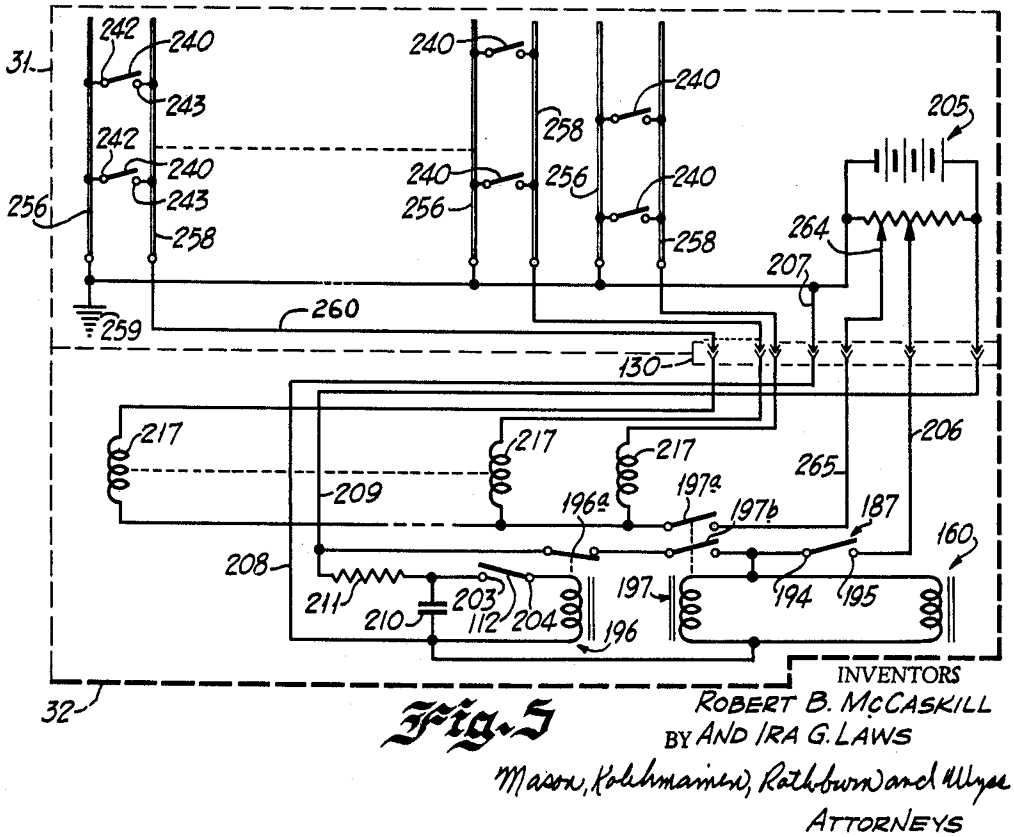
FIG. 5 is a simplified schematic diagram of the electrical circuit controlling the operation of the write-in facilities, the electrical circuits controlling the operation of the main voting machine being eliminated to simplify the illustration.

Referring next to FIG. 5 for a description of the control circuit for the drive mechanism 111, it will be observed that power for this circuit is derived from a D.C. power supply 205 located within the power supply section 36 of the main voting machine 31. The D.C. voltage from the power supply is applied to the write-in attachment through the connector 130 referred to above. Thus, assuming that the paper operated switch 112 is closed at the beginning of the voting operation and assuming further that the voter opens the cover 118 during the voting procedure, it will be observed that as soon as the door switch 187 is closed a circuit is completed through a conductor 206, through the connector 130 to one side of the D.C. power supply 205, from the other side of the D.C. power supply through a conductor 207, through the connector 130, through a conductor 208 and through the operating coil of the relay 197 to the door operated switch terminal 194. Thus, as soon as the door operated switch 187 is closed, the relay 197 is energized to close both of its normally open sets of contacts *197a* and *197b*. The contacts *197a* condition a circuit for the validating devices 113 as is described more fully hereinafter, while the contacts *197b* complete a holding circuit for locking the operating coil of the relay 197 across the D.C. power supply even though the door 118 may be returned to the closed position to open the switch 187. The holding circuit for the relay 197 includes, in addition to the contacts *197b*, the normally closed contact *196a* of the relay 196, a conductor 209 connected through the connector 130 to a positive terminal of the power supply 205. The relay 196 is not energized, however, even though the paper switch 112 is closed, because a resistor 211 connected in series with the coil of this relay drops most of the voltage from the power supply 205 so that the current through the relay coil is not sufficient to energize the relay. The electrically operated clutch 160 is also energized through the holding circuit to complete a drive connection from the member 159 to the output shaft 161. The clutch remains energized as long as the paper switch 112 remains open and, since this switch is not closed until the completion of the advance of the write-in ballot, the magnetic clutch is energized when the scanning rail begins its vote sensing sweep. As the scanning rail is driven the motor 66 is effective to drive the flexible shaft 127 thus driving the mechanism 111 to rotate the drive roller 144 and the take-up spool 114 in the manner described above. The write-in ballot paper 99 is thus advanced in synchronism with the downward or vote sensing sweep of the scanning rail and this advance continues until a perforation *99a* in the ballot paper permits the switch 112 to close whereupon a condenser 210, which was charged during the paper movement, is discharged through the operating coil of the relay 196 thus supplying sufficient current to this relay in order to open its normally closed contacts *196a*. When the contacts *196a* are open, the holding circuit for the relay 197 is broken with the result that this relay is deenergized and, at the same time, the circuit to the electrically operated magnetic clutch is broken. If the door 118 is not opened by the voter during the voting operation, the door switch 187 remains open and neither the relay 197 nor the electrically operated clutch 160 are energized. Thus, if the voter does not open the door, the scanning mechanism 68 makes its vote sensing sweep without at the same time driving the ballot paper 99, thereby avoiding a needless waste of paper.

To prevent overvoting of the machine by use of both the write-in facilities and the voting keys 50 of the main voting machine panel 42, provision is also made for validating the write-in ballot so that the write-in entries in each of the ballot spaces on the paper 99 are counted during the vote tabulation only if that ballot space has been validated. Since each ballot space corresponds to one of the office groups on the panel 42, it is validated only if the voting key 50 in the corresponding office group is in a non-voting position. This non-voting position could, of course, be a separate write-in position on the front panel 42 but, to eliminate a needless waste of panel space, the neutral position or office title space of each office group is preferably used as the non-voting position. As was previously indicated, the validating means comprises a plurality of validating devices 113 supported upon the rib 141 and spaced apart transversely of the ballot paper 99. One such validating device 113 is provided for each column of ballot spaces on the write-in ballot, but a separate validating device is not required for each ballot space in the column since the ballot spaces along each column are validated in sequence as the ballot paper is moved past the validating devices by the drive mechanism 111. While the ballot validating devices 113 could take a number of forms as, for example, a stamp or the like, they are illustrated as comprising punches for perforating each column along the left edge thereof as viewed in FIG. 13 where several validating punches have been indicated by the reference numeral *99b*. The validating punches are identical in construction and, as is shown in FIG. 10, each comprises a solenoid operated male punch 212 cooperating with a female die 213 to make the validating hole or perforation. The male punch includes a generally U-shaped bracket 214 supported upon the rib 141 by means of screws 215 acting through spacer blocks 216. The bracket 214 carries a solenoid operating coil 217 for actuating a solenoid armature 218 which is biased downwardly as viewed in FIG. 10 by means of a coil spring 219 acting between the bracket 214 and a ring 220 carried by the armature. A stop bar 225 mounted on the rib 141 limits the downward movement of the solenoid armature 218 by the spring 219. A rod 222 secured to the armature 218 extends upwardly through a punch guide 221 on the bracket 214 and through an opening 116*a* in the write-in board 116. A punch ball 224 is swaged or otherwise secured to the upper end of the rod 222 and is adapted to enter an opening 223*a* formed in a die block 223 forming part of the female die 213. The die block 223 is adjustably supported on the striker bar 95 to permit adjustment to compensate for slight differences in dimensions of the various parts, thus avoiding the necessity for adhering to extremely fine mechanical tolerances. The die block 223 is, of course, adjusted so that the ball 224 is exactly aligned with the opening 223*a*. To this end, the die block is provided with a pair of laterally depending flanges 225 and 226 which respectively seat within recesses 227 and 228 formed on the underside of the striker bar 95 adjacent a U-shaped elongated channel slot 229 in the striker bar. The latter channel accommodates the upstanding main body portion of the female die block 223. A clamping plate 230 having its opposed side edges seated within recesses 231 and 232 in the upper face of the striker bar is connected to the female die block by means of a pair of screws 233 and 234 which pass through openings 235 and 236 in the clamping plate and are threaded into tapped openings 237 and 238 in the die block. When the screws are tightened, the flanges 225 and 226 of the die block cooperate with the plate to clamp the die block to the striker bar 96 in order to hold the die block in any desired position along the channel 229. When the coil 217 is energized, the armature 218 is drawn upwardly to force the ball 224 through the ballot paper and into the opening 223*a*, thus forming one of the validating punches 99*b*.

As was indicated above, the energization of the solenoid coils 217 is so controlled that each ballot space will be validated only if the voting key of the office group which it represents has been left in the neutral or non-voting position. To this end, the counter panel 41 is adapted to support a plurality of detachable switch units or modules 240 as shown in FIGS. 14, 15, 16 and 17 of the drawings. The modules or switch devices 240 and the counter devices 40 are interchangeable in the sense that these devices may be assembled at any of the counter panel positions during programming of the machine. Thus, each switch module 240 includes a substantially enclosed housing or casing 241 having dimensions corresponding to those of the casing for the counter 40. The casing 241 is provided at its opposed ends with tabs 241*a* and 241*b* similar to the tabs on the counter casing for the purpose of engaging the springs 63 when the switch module is inserted on the counter panel. A pair of electrically conducting probes 242 and 243 extend outwardly from the switch module and are insertable through one pair 60*a* and 60*b* of the openings in the counter panel. The probes are preferably of such length that they extend entirely through the panel 60 and protrude beyond the opposite face. The probes 242 and 243 form the electrical terminals for a single pole snap switch housed within the casing 241 but this switch is not illustrated in detail since it can be of any conventional construction. The switch is normally open but is adapted to be closed by a switch actuating arm 244 extending outwardly from the switch module and through the slot 64 in the counter panel 60. The arm 244 is of such length that it extends beyond the opposite face of the counter panel and is engaged by the hooked end 78 of the counter actuator where the scanning mechanism 68 makes its vote sensing sweep provided, of course, that a voting key 50 has been left in a neutral position corresponding to the panel position of the switch module. More specifically, during programming of the machine a switch module is inserted on the counter panel 41 at a position corresponding to the neutral or non-voting position of each office group in which provision is to be made for a write-in on the ballot 99. The casing of the switch module 240 is also provided with rearwardly extending knobs or tabs 245 seating against a printed candidate strip 246 and against a transparent overlay strip 247 mounted on the counter panel in the manner described in the above-identified copending application Serial No. 120,281. Thus, after the devices 40 and 240 have been assembled during programming the different columns of the panel 41 will contain at predetermined positions therealong a plurality of counters 40 each located at a position corresponding to a selecting position on the front panel 42 of the voting machine and, in addition, the column will contain one or more switch modules 240 with one such switch module being employed for each office group where write-in provision is desired. The switch module for each office group is located on the counter panel at a position corresponding to the neutral or non-voting position of the group. If the voter desires to use the write-in facilities to make a selection within a particular office group, he merely leaves the voting key 50 for this office group in the neutral or non-voting position and, if this is done, the scanning mechanism 68 will be effective during its vote sensing sweep to provide a connection between the voting key in the neutral position and the corresponding switch module in order to actuate the switch therein. More specifically, during the vote sensing sweep of the scanning mechanism, that is, when the scanning mechanism is moving in the direction indicated by the arrowpointed line 248 in FIG. 15 where a voting key 50 is shown in the neutral position resting against one of the office stops 48, the engagement of the interposer arm 73 with the portion 59 of this voting key moves the interposer arm toward the right as viewed in FIG. 15, thus pivoting the counter actuating arm 77 in a clockwise direction upon the support arm 79 until the hooked end 78 is moved to a position where it engages the switch actuating arm 244 as the scanning rail descends. When the switch actuating arm 244 is engaged by the hooked end 78, the continued downward movement of the scanning rail is effective to draw the arm downwardly or to pivot it in a counterclockwise direction as viewed in FIG. 15, thus closing the switch within the module 240. As soon as the interposer passes over the voting key, the arm 78 pivots back to the position shown in FIG. 15 whereupon the switch actuating arm 244 is released and is spring returned to the original position. Obviously, if the voting key 50 is not in the neutral position, the arm 77 would not be moved and the switch actuating arm 244 would not be operated. Thus, it will be observed that, as the scanning rail 69 descends, the various switch modules disposed along each column of the counter panel will be actuated in sequence from top to bottom if the voting keys associated with these switch modules have been left in the neutral positions but if the voter has exercised his right to use the voting keys to cast votes for candidates appearing on the panel 42 at one or more of the office groups along the columns, then the switch module associated with that particular office group will not be actuated, but the scanning mechanism will be effective to actuate the proper counter device 40 associated with the selecting position chosen by the voter. The scanning mechanism is thus effective in each office group either to operate one of the switch modules in order to validate the write-in ballot 99 or to actuate the proper counter device to register the choice of the voter in that particular office group.

To provide a common electrical connection for all of the switch modules disposed along each column of the counter panel, there is provided a connecting bar 250 extending along each column and comprising an insulating support 251 forming a pair of substantially U-shaped channels 252 and 253 interconnected by a center web portion 254. The web portion of each connector strip is suitably secured to the counter panel, for example, by means of spaced apart nuts and bolts 255. Th U-shaped channels 252 and 253 have their open ends facing the panel 60 with the channel 252 being aligned with all of the openings 60*a* along the column while the channel 253 is aligned with all of the openings 60*b* of that column. The center web 254 of the connector strip extends slightly over the open ends of the two channels 252 and 253 thus providing a pair of lips for holding elongated resilient somewhat U-shaped conductive clips 256 and 258 respectively inserted into the channels. Each of these clips is formed of a suitable electrically conducting, resilient material such as beryllium copper and each extends throughout substantially the entire length of its channel with one leg of the clip resting against a wall of the channel and with the other leg or free end extending well into the channel to be engaged by the probes 242 or 243 of the switch modules when the latter are assembled on the counter panel. The free end of each of the conducting strips 256 and 258 is slotted or notched at spaced apart positions therealong as indicated at 257 in FIG. 16. The notches 257 are spaced apart by a distance substantially equal to the width of one selecting position, thus providing discrete segments of the conducting strip which may be flexed by the probes 242 or 243 independently of the other adjacent segments. The slotting of the strips thus insures that all of the switch modules along the column will engage the conducting strips to provide a good electrical contact.

Electrical connections are made to the conducting strips 256 and 258, preferably at the bottom ends thereof, for the purpose of controlling the punch solenoid coils 217 in the manner described above. More specifically, as is shown in FIG. 5, the conducting strips 256 may be electrically connected together and to the low voltage side of the D.C. power supply 205, for example, to ground as indicated at 259. The other conducting strip 258 of each column is individually connected through a conductor and through the plug connector 130 to one of the solenoids 217. Thus, as is shown in FIG. 5, the conductor strip 258 of the first column is connected through a conductor 260 in the main voting machine housing and through a conductor 261 in the write-in attachment to the solenoid 217 of the validating device for the first or left hand column on the write-in ballot 99. The conductor strips 258 of the remaining columns are similarly connected to their associated punch solenoids but these connections are believed to be obvious in view of the above description although only three columns and three associated punch solenoids have been illustrated in FIG. 5 for simplicity.

It will also be observed that the punch solenoids 217 are connected to the D.C. power supply 205 through a common conductor 262, through the contacts 197*a* of the relay 197, through a conductor 263 through the plug connector 130 and through a conductor 164. As was mentioned above, the relay 197 is not energized unless the voter has raised the door 118 of the write-in attachment at some time during the voting operation and, as a result, the relay contacts 197*a* will not be closed unless this door has been raised. This means that the punch solenoids 217 cannot be energized even though the switch modules are actuated during the vote sensing sweep of the scanning rail and, hence, the write-in ballot is not punched when the voter has not used the write-in facilities. However, assuming that the voter has opened the door 118 to make entries on the write-in ballot at some time during the voting operation, it will be observed that the relay 197 and the clutch 160 are energized by the closing of the door switch 187 in the manner described above. The clutch 160 and the relay 197 remain energized through the holding circuit until the advance of the ballot paper has been completed in the manner previously described. Since the relay 197 remains energized during the downward sweep of the scanning mechanism 68, the contacts 197*a* are closed throughout this sweep to condition all of the solenoids 217 for operation when the switch modules are actuated. When the scanning mechanism begins its downward sweep the drive mechanism 111 functions in the manner described above to drive the ballot paper 99 across the write-in board 116 and past all of the aligned solenoid operated punches or validating devices 113. Since there are thirty horizontal rows of selecting positions on the front panel 42 of the voting machine and only ten ballot spaces in each column of the ballot paper for each write-in segment, it follows that the ballot paper is moved for a distance equal to one ballot space as the scanning mechanism traverses a distance equal to three selecting positions or rows along the front panel. Preferably the neutral positions of the voting keys 50 and the positions of the solenoid operated punches 113 with respect to the ballot paper are so selected that the validating punch 99*b* for the office group occurs near the center and along one edge of the ballot space, thus preventing confusion as to which ballot space has been validated. This is accomplished by proper positioning of the office stops 48 during programming. When the scanning mechanism encounters a voting key 50 in the neutral position, the corresponding switch module 240 is operated in the manner described above, thus completing an electrical circuit between the conductors 256 and 258 of the column in which that switch module is positioned. This completes an electrical circuit through the solenoid 217 associated with that column in order to punch the paper. This operation is repeated along each column whenever the scanning mechanism encounters a voting key in the neutral position. By the time the scanning rail has reached its lowermost position at the end of the vote sensing sweep, the ballot sheet 99 has been advanced by a distance corresponding to ten ballot spaces or one voting segment of the paper. During the descent of the scanning mechanism the punches associated with all of the columns are energized at the proper times to produce a validating mark adjacent any valid space where a voting key has been left in the neutral or non-voting position. During the tabulation of the votes only those write-in votes which have been validated by a punch 99*b* are counted and, hence, the voter cannot effectively cast votes in a particular office group for candidates appearing on the voting panel 42 while, at the same time, using the ballot space corresponding to this office group to make a write-in entry. Any attempt to do this will cause the write-in entry to be discarded, although the counters in the office group will be actuated so that the candidate selected by the voting key receives the vote.

In view of the foregoing description, it will be observed that the apparatus described is effective to accomplish the enumerated objects of the invention. The write-in attachment is relatively small, light and compact and can be easily disassembled from the voting machine for storage following completion of the election. Moreover, if the write-in attachment is not desired in a particular jurisdiction a voting machine can be supplied to such jurisdictions without the write-in facilities with only minor modifications and at considerably less cost than the machine including the write-in attachment.

While a particular embodiment of the invention has been illustrated and described it will be apparent that many modifications will readily occur to those skilled in this art and it is, therefore, contemplated by the appended claims to cover any such modifications as fall within the true spirit and scope of the invention.

What is claimed is new and desired to be secured by Letters Patent of the United States is:

1. In a voting machine of the type employing a plurality of selectors movable to different positions indicating the voter's choices, means movable past said selectors for scanning said selectors after the voter has made his selections, means operated by said movable means to record the voter's choices, a write-in ballot and means for driving said write-in ballot simultaneously with said movable scanning means.

2. The apparatus defined by claim 1 wherein each selector is movable to a non-voting position, the write-in ballot having a plurality of spaces respectively corresponding to the non-voting positions of the selector, means for validating the spaces on the write-in ballot, and means for rendering the validating means effective to validate only those spaces corresponding to selectors which are in their non-voting positions.

3. The apparatus defined by claim 1 wherein the ballot includes a write-in space beneath a movable cover, and means interlocking said cover and said driving means for rendering said driving means effective to drive said ballot only if the voter has moved said cover.

4. The apparatus defined by claim 3 wherein the interlocking means includes an electrical switch operated by the cover, an electrically operated clutch in said driving means, and an electrical circuit including said switch for energizing said clutch only when the voter has moved said cover during the voting operation.

5. The apparatus defined by claim 4 wherein the electrical circuit includes a ballot control switch for deenergizing said clutch after said ballot has been advanced by the driving means by a predetermined distance.

6. The apparatus defined by claim 5 wherein the ballot is perforated at positions spaced apart in the direction of movement and wherein the operation of said ballot control switch is controlled by said perforations.

7. The apparatus defined by claim 1 wherein the selectors are arranged for sliding movement along side by side columns, each selector being slidable between a non-voting position and a plurality of voting positions which positions taken together, define an office group, and stop means for limiting the movement of each selector to its own office group.

8. The apparatus defined by claim 7 wherein the write-in ballot has a plurality of spaces arranged in side by side columns, each space corresponding to one of the office groups, means for validating the spaces on the ballot, and means for rendering the validating means effective to validate only those spaces corresponding to office groups having a selector in the non-voting position.

9. The apparatus defined by claim 8 wherein the scanning means comprises a mechanism movable longitudinally along the columns of selectors and carrying an actuator for each column, the validating means including a single, fixedly positioned validating device for each column, and the driving means being effective to drive said ballot past the validating devices in synchronism with the movement of said mechanism.

10. The apparatus defined by claim 8 wherein the means for rendering the validating means effective includes at least one electrical switch for each office group, the electrical switches being operated by the scanning means.

11. The apparatus defined by claim 9 wherein the means for rendering the validating means effective includes at least one electrical switch for each office group, the electrical switches being operated by the actuators of the scanning means.

12. The apparatus defined by claim 11 wherein the electrical switches are arranged in side by side columns respectively corresponding to the columns of selectors, the means for rendering the validating means effective including at least one common electrical conductor extending along each column of switches and electrically connected to each switch of its column and an electrical circuit including the common electrical conductor for connecting each column of switches to one of the validating devices, each column of switches being operated by one of said actuators as the scanning mechanism moves along the columns.

13. The apparatus defined by claim 12 wherein the columns of switches are spaced from and extend parallel to the columns of selectors, the scanning mechanism being movable through the space and the actuators being effective to engage the selectors as the scanning mechanism is moved, the switches being located along their columns at positions corresponding to the non-voting positions of the selectors, whereby each switch is operated whenever an actuator engages a selector in a non-voting position.

14. In a voting machine the combination of a support panel, a plurality of counter devices detachably mounted upon said panel, a plurality of selectors movable to different voting positions respectively corresponding to the positions of said counter devices on said panel, a plurality of switch devices detachably mounted on said panel, said switch devices and said counter devices being capable of assembly on said panel in different interchangeable positions during programming of the voting machine, each of said selectors being movable to a non-voting position, each non-voting position corresponding to the position of one of said switch devices on said panel, and actuating means rendering each of said selectors effective to actuate the device on the panel corresponding to the position of that particular selector.

15. The apparatus defined by claim 14 wherein there is further provided write-in means having a plurality of spaces thereon each corresponding to the non-voting position of one of said selectors, means for validating only those spaces on the write-in ballot corresponding to non-voting positions to which a selector has been moved, and means electrically connecting the switch devices and the validating means to operate the latter.

16. The apparatus defined by claim 14 wherein the actuating means comprises a scanning mechanism movable along said panel and past said selectors, said scanning mechanism carrying means for causing each selector to operate one of the devices on the panel.

17. The apparatus defined by claim 15 wherein the actuating means comprises a scanning mechanism movable along said panel and past said selectors, said scanning mechanism carrying means for causing each selector to operate one of the devices on the panel.

18. The apparatus defined by claim 17 wherein the validating means includes a plurality of fixed validating mechanisms together with means for moving the write-in ballot past the validating mechanisms in synchronism with the movement of said scanning mechanism along said panel, the electrical connecting means being effective to render the validating mechanisms effective to validate the ballot spaces when the switch devices on the panel are operated by the scanning mechanism.

19. The apparatus defined by claim 14 wherein the devices on said panel are arranged in a plurality of side by side columns, and wherein said selectors are slideable along side by side columns spaced from and extending parallel to the columns of the panel, each column on the panel corresponding to one of the columns of selectors.

20. The apparatus defined by claim 19 wherein each selector is slidable between a plurality of voting positions and at least one non-voting position cooperating with the voting positions to define an office group, wherein stop means are provided for limiting the sliding movement of each selector to its own office group, the columns along the panel containing devices grouped to correspond to the office groups, there being at least one switch device in each panel group corresponding to the non-voting position of the office group and a plurality of counter devices respectively corresponding to the voting positions of the office group.

21. The apparatus defined by claim 15 wherein the devices on said panel are arranged in a plurality of side by side columns, and wherein said selectors are slideable along side by side columns spaced from and extending parallel to the columns of the panel, each column on the panel corresponding to one of the columns of selectors, the ballot spaces being divided into columns respectively corresponding to the panel columns.

22. The apparatus defined by claim 20 wherein the devices on said panel are arranged in a plurality of side by side columns, and wherein said selectors are slideable along side by side columns spaced from and extending parallel to the columns of the panel, each column on the panel corresponding to one of the columns of selectors, the ballot spaces being divided into columns respectively corresponding to the panel columns.

23. The apparatus defined by claim 21 wherein the electrical connecting means includes at least one electrical conductor extending along each panel column and engaged by all of the switch devices of that column thus providing a common electrical connection for the latter switch devices.

24. The apparatus defined by claim 19 wherein the actuating means comprises a scanning mechanism movable along said panel and past the column of selectors in the space between the panel and the selectors, said scanning mechanism including an actuator for each panel column for causing the selectors of each column to operate only those panel devices located in panel positions corresponding to the positions of the selectors.

25. The apparatus defined by claim 20 wherein the actuating means comprises a scanning mechanism movable along said panel and past the column of selectors in the space between the panel and the selectors, said scanning mechanism including an actuator for each panel column for causing the selectors of each column to operate only those panel devices located in panel positions corresponding to the positions of the selectors.

26. The apparatus defined by claim 21 wherein the actuating means comprises a scanning mechanism movable along said panel and past the column of selectors in the space between the panel and the selectors, said scanning mechanism including an actuator for each panel column for causing the selectors of each column to operate only those panel devices located in panel positions corresponding to the positions of the selectors.

27. The apparatus defined by rlaim 23 wherein the actuating means comprises a scanning mechanism movable along said panel and past the column of selectors in the space between the panel and the selectors, said scanning mechanism including an actuator for each panel column for causing the selectors of each column to operate only those panel devices located in panel positions corresponding to the positions of the selectors.

28. The apparatus defined by claim 26 wherein the validating means includes a single, fixed validating device for each panel column, means for moving the write-in ballot past the validating devices in synchronism with the movement of the scanning mechanism along said panel, the electrical connecting means being effective to render each validating device effective to validate one of the ballot spaces whenever a switch device on the panel is operated by one of the actuators of the scanning mechanism.

29. The apparatus defined by claim 28 wherein the electrical connecting means includes at least one electrical conductor extending along each panel column and engaged by all of the switch devices of that column thus providing a common electrical connection for the latter switch devices.

30. For use in a voting machine of the type having a support panel with spaced apart pairs of openings therein and also having a slot adjacent each pair of openings, a switch module in the form of a self-contained unit for assembly on said panel and comprising a pair of probes for insertion within one pair of said openings, a switch actuating arm extending outwardly from said module for a distance greater than the thickness of the panel and insertable through the slot in the panel to protrude therebeyond, and a switch in said module actuated by said arm.

31. The apparatus defined by claim 30 wherein said probes are in the form of electrical terminals extending outwardly from said module for a distance greater than the thickness of the panel, whereby said probes extend beyond the panel when inserted within the pair of openings.

32. In a voting machine, the combination of a support panel having a plurality of pairs of openings arranged in side by side columns, slot means along each column, a plurality of switch means each comprising a self-contained unit detachably secured to one face of said panel, each of said switch means having a pair of electrical terminals extending through a pair of said openings and beyond the face of said panel opposite to said one face, each of said switch means including a switch actuating arm extending through the slot means of its column and protruding beyond said opposite face of the panel, each switch means including a switch operated by said arm and means extending along said opposite face of said panel to provide a common electrical connection for the switch means of each column, the last named means comprising a pair of electrical conductors extending along each column adjacent the pairs of openings of that column.

33. In a write-in device for a voting machine, the combination of a drive mechanism including an electrically operated clutch for advancing a ballot sheet past a write-in portion accessible to the voter, a movable cover normally covering said ballot sheet, and means interlocking said cover and said ballot sheet to prevent said drive mechanism from advancing said ballot unless the voter has moved said cover, said interclocking means including an electrical switch operated by the cover and connected in an electrical circuit controlling the energization of said clutch.

34. In a voting machine of the type employing a plurality of side by side columns of selectors manually operable by the voter to make selections, each column including a plurality of spaces arranged in groups with each group representing a choice to be made by the voter, said selectors being operable to indicate the choices made by the voter in each group, at least one selector in each of said groups being manually movable by the voter to a position wherein the voter may exercise the right to cast a write-in vote for the choice to be made in that group, the combination which comprises a write-in ballot accessible to the voter and including a plurality of side by side columns respectively corresponding to the columns of selectors, the columns of the write-in ballot containing spaces respectively representing the different groups, a single validating device for each column of the write-in ballot, means for producing relative movement between said ballot and said validating devices to bring the different spaces of each ballot column into coacting relation with the validating device of that column, and means for rendering the validating devices effective to validate each space of the write-in ballot only if said one selector in the group represented by that space is in said position.

35. The apparatus defined by claim 34 wherein each selector is slideable between voting and non-voting positions, the means for rendering the validating devices effective being operable to validate only those spaces on the write-in ballot corresponding to groups wherein the selectors are in their non-voting positions.

36. The apparatus defined by claim 34 wherein the ballot is disposed beneath a movable cover, and means interlocking said cover and said moving means are provided for rendering said moving means effective only if the voter has moved said cover.

37. The apparatus defined by claim 36 wherein the interlocking means includes an electrical switch operated by the cover, an electrically operated clutch in said moving means, and an electrical circuit including said switch for energizing said clutch only when the voter has moved said cover during the voting operation.

38. The apparatus defined by claim 37 wherein the moving means is effective to move the ballot past the validating devices and wherein the electrical circuit includes a ballot control switch for deenergizing said clutch after said ballot has been advanced a predetermined distance by the moving means.

39. The apparatus defined by claim 38 wherein the ballot is perforated at positions spaced apart in the direction of movement and wherein the operation of said ballot control switch is controlled by said perforations.

40. The apparatus defined by claim 34 wherein scanning means are moved along said columns to determine the voter's selections and wherein the ballot moving means is operated simultaneously with the scanning means.

41. The apparatus defined by claim 40 wherein the means for rendering the validating devices effective includes at least one electrical switch for each office group, the electrical switches being operated by the scanning means.

42. The apparatus defined by claim 41 wherein the electrical switches are arranged in side by side columns respectively corresponding to the columns of selectors, the means for rendering the validating devices effective including at least one common electrical conductor extending along each column of switches and electrically connected to each switch of its column and an electrical circuit including the common electrical conductor for connecting each column of switches to one of the validating devices, an actuator on the scanning means for each column of switches for operating the switches as the scanning mechanism moves along the columns.

43. The apparatus defined by claim 42 wherein the columns of switches are spaced from and extend parallel to the columns of selectors, the scanning means being movable through the latter space and the actuators being effective to engaged the selectors as the scanning mechanism is moved, the selectors of each group being movable from voting to non-voting positions, the switches being located along their columns at positions corresponding to the non-voting positions of the selectors, whereby each switch is operated whenever an actuator engages a selector in a non-voting position.

44. In a voting machine the combination of a first panel, a plurality of switch devices detachably mounted on said first panel, a second panel extending generally parallel to said first panel, a plurality of selectors each slidably movable along said second panel between at least one voting position and a non-voting position corresponding to the position of one of said switch devices on said panel, and actuating means rendering each of said selectors effective when in the non-voting position to actuate the switch device corresponding to that non-voting position.

45. The apparatus defined by claim 44 wherein there is further provided write-in means having a plurality of spaces thereon each corresponding to the non-voting position of one of said selectors, means for validating only those spaces on the write-in ballot corresponding to non-voting positions to which a selector has been moved, and means electrically connecting the switch devices and the validating means to operate the latter.

46. The apparatus defined by claim 44 wherein the actuating means comprises a scanning mechanism movable along said panels and past said selectors, said scanning mechanism carrying means for causing each selector in a non-voting position to operate one of the switch devices.

47. The apparatus defined by claim 45 wherein the actuating means comprises a scanning mechanism movable along said panels and past said selectors, said scanning mechanism carrying means for causing each selector in a non-voting position to operate one of the switch devices.

48. The apparatus defined by claim 47 wherein the validating means includes a plurality of fixed validating mechanisms together with means for moving the write-in ballot past the validating mechanisms in synchronism with the movement of said scanning mechanism along said panels, the electrical connecting means being effective to render the validating mechanisms effective to validate the ballot spaces when the switch devices on the first panel are operated by the scanning mechanism.

49. The apparatus defined by claim 44 wherein the switch devices on said first panel are arranged in a plurality of side by side columns, and wherein said selectors are slideable along side by side columns spaced from and extending parallel to the columns of the first panel, each column on the first panel corresponding to one of the columns of selectors.

50. The apparatus defined by claim 49 wherein each selector is slideable between said voting positions and its non-voting position which positions taken together, define an office group, wherein stop means are provided for limiting the sliding movement of each selector to its own office group, the columns along the first panel containing switch devices grouped to correspond to the office groups, there being at least one switch device in each of the groups on said first panel in a position corresponding to the non-voting position of the office group.

51. In a voting machine a column of selectors manually operable by the voter to make his selections, the selectors being arranged in groups and at least one selector of each group being operable to a position indicating that the voter desires to make a write-in choice in that group, a write-in ballot accessible to the voter and containing a plurality of spaces respectively representing the different groups, a single validating device for said column of selectors, means for producing relative movement between said ballot and said device to bring said device into coacting relation with the different spaces, and means for rendering the validating device effective to validate each space only if said one selector in the group represented by that space is in said position.

52. The apparatus defined by claim 51 wherein each selector is slideable between voting and non-voting positions, the means for rendering the validating devices effective being operable to validate only those spaces on the write-in ballot corresponding to groups wherein the selectors are in their non-voting positions.

53. The apparatus defined by claim 51 wherein the ballot is disposed beneath a movable cover, and means interlocking said cover and said moving means are provided for rendering said moving means effective only if the voter has moved said cover.

54. The apparatus defined by claim 53 wherein the interlocking means includes an electrical switch operated by the cover, an electrically operated clutch in said moving means, and an electrical circuit including said switch for energizing said clutch only when the voter has moved said cover during the voting operation.

55. The apparatus defined by claim 54 wherein the moving means is effective to move the ballot past the validating devices and wherein the electrical circuit includes a ballot control switch for deenergizing said clutch after said ballot has been advanced a predetermined distance by the moving means.

56. The apparatus defined by claim 55 wherein the ballot is perforated at positions spaced apart in the direction of movement and wherein the operation of said ballot control switch is controlled by said perforations.

57. The apparatus defined by claim 34 wherein scanning means are moved along said column to determine the voter's selections and wherein the ballot moving means is operated simultaneously with the scanning means.

58. The apparatus defined by claim 57 wherein the means for rendering the validating devices effective includes at least one electrical switch for each group of selectors, the electrical switches being operated by the scanning means.

59. The apparatus defined by claim 58 wherein the electrical switches are arranged in a column corresponding to the column of selectors, the means for rendering the validating device effective including at least one common electrical conductor extending along the column of switches and electrically connected to each switch, and an electrical circuit including the common electrical conductor for connecting the column of switches to said validating device, an actuator on the scanning means for operating the switches as the scanning mechanism moves along the column.

60. The apparatus defined by claim 59 wherein the column of switches is spaced from and extends parallel to the column of selectors, the scanning means being movable through the latter space and the actuator being effective to engage the selectors as the scanning mechanism is moved, each selector being movable between voting and non-voting positions, the switches being located along their column at positions respectively corresponding to the non-voting positions of the selectors, whereby each switch is operated whenever said actuator engages a selector in a non-voting position.

61. In a voting machine, a main voting machine including a plurality of manually operable selectors for operation by the voter to make his selections, a write-in attachment detachably secured to the main voting machine, said write-in attachment including a drive mechanism for advancing a write-in ballot, said drive mechanism comprising a motor in the main voting machine, and a pair of detachable interengaging drive coupling members one of which is mounted on the write-in attachment and the other of which is mounted on the main voting machine, said members being disengageable to permit the write-in attachment to be removed from the main voting machine.

References Cited by the Examiner

UNITED STATES PATENTS

| | | | |
|---|---|---|---|
| 613,164 | 10/98 | MacKenzie | 235—55 |
| 772,142 | 10/04 | Glenn | 235—54 |
| 920,102 | 4/09 | Winslow | 235—55 |
| 938,126 | 10/26 | Dean | 235—54 |
| 982,736 | 1/11 | McElroy | 235—54 |
| 984,149 | 2/11 | Ocumpaugh | 235—54 |
| 1,031,171 | 7/12 | Dean | 235—54 |
| 1,158,646 | 11/15 | Dean | 235—54 |
| 1,179,350 | 4/16 | Currey | 235—54 |
| 2,195,848 | 4/40 | Carroll | 235—50 |
| 3,024,974 | 3/62 | Hocker | 235—51 |

LEO SMILOW, *Primary Examiner.*